US012683792B2

(12) United States Patent
Jiang et al.

(10) Patent No.: US 12,683,792 B2
(45) Date of Patent: Jul. 14, 2026

(54) IDENTITY AUTHENTICATION SYSTEM, METHOD, APPARATUS, AND DEVICE, AND COMPUTER-READABLE STORAGE MEDIUM

(71) Applicant: HUAWEI TECHNOLOGIES CO., LTD., Shenzhen (CN)

(72) Inventors: Weiyu Jiang, Beijing (CN); Bingyang Liu, Shenzhen (CN); Chuang Wang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 306 days.

(21) Appl. No.: 18/315,564

(22) Filed: May 11, 2023

(65) Prior Publication Data

US 2023/0283475 A1 Sep. 7, 2023

Related U.S. Application Data

(63) Continuation of application No. PCT/CN2021/123912, filed on Oct. 14, 2021.

(30) Foreign Application Priority Data

Nov. 12, 2020 (CN) .......................... 202011262480.0

(51) Int. Cl.
*H04L 9/32* (2006.01)
*H04L 9/08* (2006.01)
(52) U.S. Cl.
CPC .......... *H04L 9/3226* (2013.01); *H04L 9/0866* (2013.01)

(58) Field of Classification Search
CPC ........................... H04L 9/3226; H04L 9/0866
(Continued)

(56) References Cited

U.S. PATENT DOCUMENTS 6,711,400 B1 * 3/2004 Aura ................... H04W 12/069
455/433
7,530,098 B2 * 5/2009 Anderson ........... H04W 12/069
726/7
(Continued)

FOREIGN PATENT DOCUMENTS

CN 101674304 A 3/2010
CN 104468618 A 3/2015
(Continued)

OTHER PUBLICATIONS

ETSI TS 133 501—V15.4.0—5G; Security architecture and procedures for 5G System (3GPP TS 33.501 version 15.4.0 Release 15).pdf (Year: 2019).*
(Continued)

*Primary Examiner* — Samson B Lemma
(74) *Attorney, Agent, or Firm* — Rimon PC

(57) ABSTRACT

Embodiments of this application disclose an identity authentication system and method. In an embodiment of this application, a symmetric key based identity verification method is implemented by sharing asymmetric key between a terminal device and an authorization device. In this way, when the symmetric key is kept confidential, authentication codes generated based on the symmetric key in an entire identity authentication process cannot be easily forged, to ensure the security and reliability of the identity authentication process.

10 Claims, 9 Drawing Sheets

(58) Field of Classification Search
USPC .................................................. 713/155, 168
See application file for complete search history.

(56) References Cited

U.S. PATENT DOCUMENTS

| | | | | | |
|---|---|---|---|---|---|
| 7,545,768 | B2 * | 6/2009 | Haverinen | .......... | H04L 63/0869 |
| | | | | | 370/328 |
| 9,106,648 | B2 * | 8/2015 | Zhou | ................... | H04L 65/1069 |
| 10,630,693 | B1 * | 4/2020 | Kotamraju | ............ | H04L 63/102 |
| 10,694,376 | B2 * | 6/2020 | Kang | ..................... | H04W 88/18 |
| 11,240,025 | B2 * | 2/2022 | Wentz | ................... | G06F 21/602 |
| 11,552,946 | B2 * | 1/2023 | Bhattacharyya | .... | H04L 63/0823 |
| 2006/0095505 | A1 * | 5/2006 | Zimmer | ................ | G06F 21/575 |
| | | | | | 709/203 |
| 2006/0161774 | A1 * | 7/2006 | Huh | ......................... | H04L 9/321 |
| | | | | | 713/168 |
| 2006/0251257 | A1 * | 11/2006 | Haverinen | .......... | H04L 63/0869 |
| | | | | | 726/2 |
| 2014/0006785 | A1 * | 1/2014 | Shaliv | ................. | H04L 63/0428 |
| | | | | | 713/170 |
| 2016/0134627 | A1 * | 5/2016 | Johnson | ................... | H04L 63/08 |
| | | | | | 713/172 |
| 2016/0234176 | A1 * | 8/2016 | Chu | ......................... | H04L 63/04 |
| 2017/0244692 | A1 * | 8/2017 | Bhupathiraju | ........ | H04L 63/083 |
| 2018/0295119 | A1 * | 10/2018 | Curtis | ..................... | H04L 63/08 |
| 2019/0253403 | A1 * | 8/2019 | Li | .......................... | H04L 9/3226 |
| 2020/0068397 | A1 * | 2/2020 | Kang | ................... | H04W 88/18 |
| 2020/0275268 | A1 * | 8/2020 | Pan | ........................... | H04L 9/32 |
| 2022/0158855 | A1 * | 5/2022 | Wentz | ................... | H04L 9/3247 |

FOREIGN PATENT DOCUMENTS

| | | |
|---|---|---|
| CN | 104506534 A | 4/2015 |
| CN | 106817697 A | 6/2017 |
| WO | 2016040176 A1 | 3/2016 |

OTHER PUBLICATIONS

E. Rescorla Mozilla, Request for Comments (RFC): 8446; Internet Engineering Task Force (IETF) ( Aug. 2018).*

Andrew S. Tanenbaum et al., "Computer Networks," Fifth Edition, Dec. 31, 2011; 962 total pages.
H. Krawczyk et al, "HMAC-based Extract-and-Expand Key Derivation Function (HKDF)," Internet Engineering Task Force (IETF), Request for Comments: 5869, Category: Informational, ISSN: 2070-1721, May 2010, XP015070809A; 14 total pages.
Hugo Krawczyk, "Cryptographic Extraction and Key Derivation: The HKDF Scheme," IBM T.J. Watson Research Center, Oct. 19, 2010 (Oct. 19, 2010), Springer Berlin Heidelberg, Copenhagen, Denmark, XP093187300, ISSN: 0302-9743, vol. 6223; 20 total pages.
Wikipedia, "HKDF," Jul. 25, 2020 (Jul. 25, 2020), XP093187284, Retrieved from the Internet: URL: https://en.wikipedia.org/w/index. php?title=HKDFandoldid=969425705; 3 total pages.
"Chapter 12: Key Establishment Protocols," Handbook of Applied Cryptography, Menezes et al., Oct. 1, 1996, (Oct. 1, 1996), XP001525012; 54 total pages.
"Chapter 13: Key Management Techniques," Handbook of Applied Cryptography, Menezes et al., Oct. 1, 1996, (Oct. 1, 1996), XP001525013; 49 total pages.
M. Pritikin et al., "Enrollment over Secure Transport," Internet Engineering Task Force (IETF), Request for Comments: 7030; ISSN: 2070-1721; Oct. 2013; 53 total pages.
S. Cheshire et al., "DNS-Based Service Discovery," Internet Engineering Task Force (IETF), Request for Comments: 67623 ISSN: 2070-1721; Feb. 2013; 49 total pages.
S. Cheshire et al., "Multicast DNS," Internet Engineering Task Force (IETF), Request for Comments: 6762; ISSN: 2070-1721; Feb. 2013; 70 total pages.
K. Watsen et al., "Secure Zero Touch Provisioning (SZTP)," Internet Engineering Task Force (IETF), Request for Comments: 8572; ISSN: 2070-1721; Apr. 2019; 87 total pages.
M. Pritikin et al., "Bootstrapping Remote Secure Key Infrastructures (BRSKI)," draft-ietf-anima-bootstrapping-keyinfra-34, ANIMA WG; Jan. 3, 2020; 121 total pages.
E. Rescorla et al., "The Transport Layer Security (TLS) Protocol Version 1.3," Internet Engineering Task Force (IETF), Request for Comments: 8446; ISSN: 2070-1721; Aug. 2018; 160 total pages.
B. Kaliski, "PKCS #5: Password-Based Cryptography Specification Version 2.0," RSA Laboratories, Network Working Group, Request for Comments: 2898; Sep. 2000; 34 total pages.

* cited by examiner

IDENTITY AUTHENTICATION SYSTEM, METHOD, APPARATUS, AND DEVICE, AND COMPUTER-READABLE STORAGE MEDIUM

CROSS-REFERENCE TO RELATED APPLICATIONS

This application is a continuation of International Application No. PCT/CN2021/123912, filed on Oct. 14, 2021, which claims priority to Chinese Patent Application No. 202011262480.0, filed on Nov. 12, 2020. The disclosures of the aforementioned applications are hereby incorporated by reference in their entireties.

TECHNICAL FIELD

Embodiments of this application relate to the field of security technologies, and in particular, to an identity authentication system, method, apparatus, and device, and a computer-readable storage medium.

BACKGROUND

In settings such as a campus network or an enterprise network, after a large quantity of terminal devices are connected to the network, such as Internet of Things (IoT) devices, routers, switches, mobile phones, and personal computers (PC), users usually need to manage the connected terminal devices in a unified manner, for example, allocate identities (ID) and deliver configuration information, so that the terminal devices can be correctly identified when accessing the campus network or enterprise network and can communicate with other devices on the network. Before the terminal devices can be managed in the unified manner, identity authentication also needs to be performed on the terminal devices, to ensure that terminal devices accessing the campus network or enterprise network are devices authorized by a campus or an enterprise.

In a related technology, a registration device of the campus or the enterprise stores a media access control (MAC) address set of all authorized terminal devices. When accessing a network, a terminal device first searches for a network signal, and finds the registration device, and then sends an authentication request to the registration device. The authentication request carries a MAC address of the terminal device. If the registration device verifies that the MAC address carried in the authentication request is included in the MAC address set stored in the registration device, identity authentication on the terminal device succeeds.

However, because the MAC address of a terminal device may be randomly forged or tampered with, this identity authentication method is not secure. In addition, when such method is used, if the terminal device detects a network signal sent by a malicious device, and sends an authentication request to the malicious device, the malicious device can pretend that identity verification on the terminal device succeeds, and further implant information such as malicious code into the terminal device. This poses a serious security loophole.

SUMMARY

Embodiments of this application provide an identity authentication system, method, apparatus, and device, and a computer-readable storage medium, so that security of identity authentication can be improved. The technical solutions are as follows:

According to a first aspect, an identity authentication system is provided. The identity authentication system has a function of a behavior of implementing the identity authentication method in the following second aspect, third aspect, and fourth aspect. Refer to related descriptions in the following second aspect, third aspect, and fourth aspect. The identity authentication system includes a terminal device, a registration device, and an authorization device. The terminal device and the authorization device share a first symmetric key, the authorization device stores an ownership relationship record of the terminal device, and the ownership relationship record describes a binding relationship between the terminal device and a current owner of the terminal device.

The terminal device is configured to send a first authentication request to the registration device, where the first authentication request carries a first authentication code, and the first authentication code is generated based on the first symmetric key.

The registration device is configured to: receive the first authentication request, generate a second authentication request based on the first authentication request, and send the second authentication request to the authorization device, where the second authentication request carries the first authentication code.

The authorization device is configured to: receive the second authentication request, verify the first authentication code based on the first symmetric key and the ownership relationship record, and send a first authentication acknowledgement message to the registration device after verification succeeds, where the first authentication acknowledgement message indicates to authorize an ownership relationship between the terminal device and a network to which the registration device belongs, the first authentication acknowledgement message carries a second authentication code, and the second authentication code is generated based on the first symmetric key.

The registration device is further configured to: receive the first authentication acknowledgement message, determine a second authentication acknowledgement message based on the first authentication acknowledgement message, and send the second authentication acknowledgement message to the terminal device, where the second authentication acknowledgement message carries the second authentication code.

The terminal device is further configured to: receive the second authentication acknowledgement message, verify the second authentication code based on the first symmetric key, and determine, after verification succeeds, that bidirectional identity authentication of the terminal device and the registration device succeeds.

In some embodiments of this application, a symmetric key based identity verification method is implemented by sharing the first symmetric key between the terminal device and the authorization device. In this way, when confidentiality of the symmetric key is ensured, authentication code generated based on the symmetric key in an entire identity authentication process is not easily forged, so that security and reliability of identity authentication can be ensured. In addition, bidirectional identity authentication of the terminal device and the registration device is implemented by using the authorization device, to avoid a security issue of unidirectional identity authentication and improve the security of the authentication process.

According to a second aspect, an identity authentication method is provided. The method is performed by a terminal device, the terminal device and an authorization device share a first symmetric key, the authorization device stores an ownership relationship record of the terminal device, and the ownership relationship record describes a binding relationship between the terminal device and a current owner of the terminal device. The method includes:

The terminal device sends a first authentication request, where the first authentication request carries a first authentication code, and the first authentication code is generated based on the first symmetric key; the terminal device receives a second authentication acknowledgement message, where the second authentication acknowledgement message is determined after verification on the first authentication code based on the first symmetric key and the ownership relationship record succeeds, the second authentication acknowledgement message carries a second authentication code, and the second authentication code is generated by the authorization device based on the first symmetric key; and the terminal device verifies the second authentication code based on the first symmetric key, and determines, after verification succeeds, that bidirectional identity authentication of the terminal device and the registration device succeeds.

In some embodiments of this application, a symmetric key based identity verification method is implemented by sharing the first symmetric key between the terminal device and the authorization device. In this way, when confidentiality of the symmetric key is ensured, authentication code generated based on the symmetric key in an entire identity authentication process is not easily forged, so that security and reliability of identity authentication can be ensured. In addition, in this solution, bidirectional identity authentication of the terminal device and the registration device is implemented by using the authorization device, to avoid a security issue of unidirectional identity authentication. That is, security of this solution is higher.

Optionally, the first authentication request further carries a first ID and a first key parameter, the first key parameter includes plaintext or ciphertext of a first authentication vector (AV), and the first ID is an ID configured by an original owner of the terminal device for the terminal device; the first AV includes a first random parameter and a first anti-replay attack parameter, the first random parameter is generated by the terminal device, and the first random parameter includes at least one of a first random number N1 or a second random number N2; and the first authentication code is generated based on the first symmetric key, the first ID, and the first AV.

To be specific, the first authentication request further carries the first ID of the terminal device, and the authorization device verifies the first ID carried in the first authentication request based on the ownership relationship record, to ensure that the terminal device is a device within a sales scope. The first authentication request further carries the first key parameter. The authorization device obtains the first random parameter and the first anti-replay attack parameter in the first key parameter, and verifies, based on the first anti-replay attack parameter, whether identity authentication at this time is subjected to a replay attack. The first random parameter is used for the authorization device to verify the first authentication code, that is, verify validity of an identity of the terminal.

Optionally, the ciphertext of the first AV is obtained by encryption by using the key shared by the terminal device and the authorization device. For example, encryption is performed by using the first symmetric key or by using a key derived based on the first symmetric key, to improve security of identity authentication.

Optionally, the first authentication request further carries first identity information, and the first identity information includes at least one of identity information of the registration device or identity information of a network to which the registration device belongs; and the first authentication code is generated based on the first symmetric key, the first ID, the first AV, and the first identity information. To be specific, the first authentication request further carries information about an access network of the terminal device, and the authorization device verifies the first identity information based on the ownership relationship record, to ensure an identity binding relationship between the registration device and the sold terminal device. Optionally, the first identity information is information sent by the registration device to the terminal device in response to that the terminal device sends a network access request to the registration device after finding the registration device by using a network.

Optionally, the second authentication acknowledgement message further carries a second key parameter; and that the terminal device verifies the second authentication code based on the first symmetric key includes: The terminal device generates a symmetric verification key based on the first symmetric key and the second key parameter; and the terminal device verifies the second authentication code based on the symmetric verification key To be specific, the authorization device sends the second key parameter used for generating the second authentication code to the terminal device in response, and the terminal device verifies the second authentication code based on the first symmetric key and the second key parameter, so that the symmetric key is used to verify signature validity of the authorization device. It should be noted that, the first authentication code may be understood as a signature of the terminal device, and the second authentication code may be understood as a signature of the authorization device.

Optionally, after the terminal device determines that the bidirectional identity authentication of the terminal device and the registration device succeeds, the method further includes: The terminal device generates a channel security key based on the first symmetric key and a first derived parameter, where the first derived parameter is determined based on the second key parameter; a first secure transport channel is established between the terminal device and the registration device based on the channel security key; and the terminal device negotiates a second symmetric key with the registration device based on a second derived parameter by using the first secure transport channel, where the second symmetric key is used for network access identity authentication when the terminal device accesses the network to which the registration device belongs, and the second derived parameter is determined based on the second key parameter.

To be specific, after the terminal device and the registration device implement symmetric key based bidirectional identity authentication by using the authorization device, the terminal device and the registration device can further establish the secure transport channel and negotiate the second symmetric key based on a response of the authorization device. That is, the first symmetric key is shared only between the terminal device and the authorization device, and after the terminal device and the registration device negotiate the second symmetric key, the second symmetric key is shared only between the terminal device and the registration device as a new device key between the terminal device and the registration device.

Optionally, that the terminal device negotiates the second symmetric key with the registration device based on the second derived parameter by using the first secure transport channel includes: The terminal device generates a random number N4, and sends N4 to the registration device by using the first secure transport channel, where N4 is used for the registration device to generate the second symmetric key based on N4 and a second negotiation key, and to generate third authentication code based on N4 and the second symmetric key, where the second negotiation key is generated by the authorization device based on the second derived parameter and is sent to the registration device; the terminal device generates the second symmetric key based on N4 and the second derived parameter; the terminal device receives a first negotiation acknowledgement message sent by the registration device, where the first negotiation acknowledgement message carries the third authentication code; and the terminal device verifies the third authentication code based on the second symmetric key and N4 that are generated by the terminal device, and updates, after verification succeeds, the second symmetric key to a device key between the terminal device and the registration device, and sends a second negotiation acknowledgement message to the registration device, where the second negotiation acknowledgement message indicates to the registration device to update the second symmetric key to the device key between the registration device and the terminal device.

To be specific, the terminal device and the registration device negotiate the second symmetric key based on the random number N4 generated by the terminal device.

Optionally, that the terminal device generates the second symmetric key with the registration device based on the second derived parameter by using the first secure transport channel includes: The terminal device receives a random number N5 sent by the registration device by using the first secure transport channel, where N5 is randomly generated by the registration device, and N5 is used for the registration device to generate the second symmetric key based on N5 and a second negotiation key, and to update the second symmetric key to a device key between the registration device and the terminal device; and the terminal device generates the second symmetric key based on N5 and the second derived parameter, and updates the second symmetric key to the device key between the terminal device and the registration device.

To be specific, the terminal device and the registration device can also negotiate the second symmetric key based on the random number N5 generated by the registration device.

Optionally, after the terminal device negotiates the second symmetric key with the registration device based on the second derived parameter by using the first secure transport channel, the method further includes: The terminal device receives at least one of a second ID or configuration information that are sent by the registration device by using the first secure transport channel, where the second ID is an ID generated by a current owner of the terminal device for the terminal device, for example, an ID generated by the registration device for the terminal device, or an ID generated by a controller in the network to which the registration device belongs for the terminal device, and the configuration information is a configuration file delivered by the current owner of the terminal device for the terminal device. The second ID is a unique ID of the terminal device within a network range to which the registration device belongs, and the second ID is also used for network access identity authentication when the terminal device accesses the network to which the registration device belongs.

According to a third aspect, an identity authentication method is provided. The method is performed by a registration device. The method includes:

The registration device receives a first authentication request, where the first authentication request carries a first authentication code, the first authentication code is generated by a terminal device based on a first symmetric key, and the terminal device and an authorization device share the first symmetric key; the registration device generates a second authentication request based on the first authentication request, and sends the second authentication request to the authorization device, where the second authentication request carries the first authentication code; the registration device receives a first authentication acknowledgement message, where the first authentication acknowledgement message is determined after verification performed by the authorization device on the first authentication code based on the first symmetric key and an ownership relationship record of the terminal device succeeds, the authorization device stores the ownership relationship record, the ownership relationship record describes a binding relationship between the terminal device and a current owner of the terminal device, the first authentication acknowledgement message indicates to authorize an ownership relationship between the terminal device and a network to which the registration device belongs, the first authentication acknowledgement message carries a second authentication code, and the second authentication code is generated based on the first symmetric key; and the registration device determines a second authentication acknowledgement message based on the first authentication acknowledgement message, and sends the second authentication acknowledgement message to the terminal device, where the second authentication acknowledgement message carries the second authentication code, and the second authentication acknowledgement message indicates to the terminal device to determine, after verification on the second authentication code based on the first symmetric key succeeds, that bidirectional identity authentication of the terminal device and the registration device succeeds.

In some embodiments of this application, a symmetric key based identity verification method is implemented by sharing the first symmetric key between the terminal device and the authorization device. In this way, when confidentiality of the symmetric key is ensured, authentication code generated based on the symmetric key in an entire identity authentication process is not easily forged, so that security and reliability of identity authentication can be ensured. In addition, in this solution, bidirectional identity authentication of the terminal device and the registration device is implemented by using the authorization device, to avoid a security issue of unidirectional identity authentication. That is, security of this solution is higher.

Optionally, the first authentication request further carries a first ID, the first ID is an ID configured by an original owner of the terminal device for the terminal device, the second authentication request further carries the first ID in the first authentication request, the second authentication request further carries first identity information, and the first identity information includes at least one of identity information of the registration device or identity information of the network to which the registration device belongs.

Optionally, when the first authentication request does not carry the first identity information, the first identity information carried in the second authentication request is added by the registration device.

Optionally, the second authentication request further carries an identity signature of the registration device, and the identity signature of the registration device is a signature conducted by the registration device on the first authentication request and the first identity information by using a private key.

Optionally, the identity information of the registration device includes at least one of a digital certificate related to an identity of the registration device or a digest of the digital certificate related to the identity of the registration device.

Optionally, the first authentication acknowledgement message further carries key update information, the key update information is encrypted and protected by using a symmetric key shared by the registration device and the authorization device, or the key update information is encrypted and protected by using a public key of the registration device.

After the registration device receives the first authentication acknowledgement message, the method further includes: The registration device obtains a channel security key from the key update information. After the registration device sends the second authentication acknowledgement message to the terminal device, the method further includes: A first secure transport channel is established between the registration device and the terminal device based on the channel security key; and the registration device negotiates a second symmetric key with the terminal device based on the key update information by using the first secure transport channel, where the second symmetric key is used for network access identity authentication when the terminal device accesses the network to which the registration device belongs.

To be specific, the registration device and the terminal device can also establish the secure transport channel and negotiate the second symmetric key based on a response of the authorization device.

Optionally, after the registration device negotiates the second symmetric key with the terminal device based on the key update information by using the first secure transport channel, the method further includes: The registration device sends at least one of a second ID or configuration information to the terminal device by using the first secure transport channel, where the second ID is an ID generated by a current owner of the terminal device for the terminal device, and the configuration information is a configuration file delivered by the current owner of the terminal device for the terminal device. The second ID is a unique ID of the terminal device within a network range to which the registration device belongs, and the second ID is also used for network access identity authentication when the terminal device accesses the network to which the registration device belongs.

According to a fourth aspect, an identity authentication method is provided. The method is performed by an authorization device, the authorization device and a terminal device share a first symmetric key, the authorization device stores an ownership relationship record of the terminal device, the ownership relationship record describes a binding relationship between the terminal device and a current owner of the terminal device, and the method includes:

The authorization device receives a second authentication request, where the second authentication request carries a first authentication code, and the first authentication code is generated by the terminal device based on the first symmetric key; the authorization device verifies the first authentication code based on the first symmetric key and the ownership relationship record; and the authorization device sends a first authentication acknowledgement message after verification succeeds, where the first authentication acknowledgement message indicates to authorize an ownership relationship between the terminal device and a network to which the registration device belongs, the first authentication acknowledgement message carries a second authentication code, the second authentication code is generated based on the first symmetric key, and the second authentication code indicates to the terminal device to determine, after verification on the second authentication code based on the first symmetric key succeeds, that bidirectional identity authentication of the terminal device and the registration device succeeds.

In some embodiments of this application, a symmetric key based identity verification method is implemented by sharing the first symmetric key between the terminal device and the authorization device. In this way, when confidentiality of the symmetric key is ensured, authentication code generated based on the symmetric key in an entire identity authentication process is not easily forged, so that security and reliability of identity authentication can be ensured. In addition, in this solution, bidirectional identity authentication of the terminal device and the registration device is implemented by using the authorization device, to avoid a security issue of unidirectional identity authentication. That is, security of this solution is higher.

Optionally, the second authentication request further carries a first ID, a first key parameter, and first identity information, the first key parameter is generated by the terminal device, the first identity information includes at least one of identity information of the registration device or identity information of the network to which the registration device belongs, the first ID is an ID configured by an original owner of the terminal device for the terminal device, and the ownership relationship record includes a mapping relationship between the first ID and the first identity information. After the authorization device receives the second authentication request, the method further includes: The authorization device verifies the first ID and the first identity information based on the ownership relationship record; and that the authorization device verifies the first authentication code based on the first symmetric key and the ownership relationship record includes: The authorization device verifies the first authentication code based on the ownership relationship record, the first ID, the first symmetric key, and the first key parameter.

To be specific, the authorization device verifies the identities of the terminal device and the registration device based on the ownership relationship record. In addition, the first key parameter used by the terminal device to generate the first authentication code is sent to the authorization device, and the authorization device verifies, based on the first key parameter and the first symmetric key, the first authentication code based on the symmetric key.

Optionally, the first authentication acknowledgement message further carries a second key parameter, the second key parameter includes plaintext or ciphertext of a second AV, and the ciphertext of the second AV is obtained by using the key shared by the authorization device and the terminal device; and the second AV includes a second anti-replay attack parameter, the second authentication code is generated based on the first symmetric key and the second AV, and the first authentication acknowledgement message is further used for the terminal device to verify the second authentication code based on the first symmetric key and the second key parameter.

To be specific, a response of the authorization device further carries the second key parameter, and the terminal device can verify, based on the second key parameter and the first symmetric key, the second authentication code based on the symmetric key, to ensure signature validity of the authorization device.

Optionally, the first authentication acknowledgement message further carries key update information, and the key update information is generated based on the first symmetric key and the second AV; and the key update information is used for the registration device to obtain a channel security key required for establishing a first secure transport channel with the terminal device, and to negotiate a second symmetric key with the terminal device by using the first secure transport channel, the second key parameter is further used for the terminal device to determine a first derived parameter required for generating the channel security key, and to determine a second derived parameter required for negotiating the second symmetric key with the registration device by using the first secure transport channel, and the second symmetric key is used for network access identity authentication when the terminal device accesses the network to which the registration device belongs.

To be specific, the response of the authorization device further carries the key update information, and the registration device can obtain the channel security key from the key update information, to establish the secure transport channel with the terminal device, and the registration device can also obtain a negotiation key from the key update information to negotiate the second symmetric key with the terminal device. The terminal device can generate a parameter of the channel security key based on the second key parameter sent by the authorization device in response, and determine, based on the second key parameter, a parameter for negotiating the second symmetric key.

According to a fifth aspect, an identity authentication apparatus is provided. The identity authentication apparatus has a function of implementing the identity authentication method in the second aspect. The identity authentication apparatus includes one or more modules. The one or more modules are configured to implement the identity authentication method provided in the second aspect.

To be specific, an identity authentication apparatus is provided. The apparatus is applied to a terminal device, the terminal device and an authorization device share a first symmetric key, the authorization device stores an ownership relationship record of the terminal device, and the ownership relationship record describes a binding relationship between the terminal device and a current owner of the terminal device. The apparatus includes:

a sending module, configured to send a first authentication request, where the first authentication request carries a first authentication code, and the first authentication code is generated based on the first symmetric key;

a receiving module, configured to receive a second authentication acknowledgement message, where the second authentication acknowledgement message is determined after verification on the first authentication code based on the first symmetric key and the ownership relationship record succeeds, the second authentication acknowledgement message carries a second authentication code, and the second authentication code is generated by the authorization device based on the first symmetric key; and a verification module, configured to: verify the second authentication code based on the first symmetric key, and determine, after verification succeeds, that bidirectional identity authentication of the terminal device and a registration device succeeds.

Optionally, the first authentication request further carries a first ID and a first key parameter, the first key parameter includes plaintext or ciphertext of a first authentication vector AV, and the first ID is an ID configured by an original owner of the terminal device for the terminal device.

The first AV includes a first random parameter and a first anti-replay attack parameter, the first random parameter is generated by the terminal device, and the first random parameter includes at least one of a first random number N1 or a second random number N2.

The first authentication code is generated based on the first symmetric key, the first ID, and the first AV.

Optionally, the first authentication request further carries first identity information, and the first identity information includes at least one of identity information of the registration device or identity information of a network to which the registration device belongs.

The first authentication code is generated based on the first symmetric key, the first ID, the first AV, and the first identity information.

Optionally, the second authentication acknowledgement message further carries a second key parameter.

The verification module includes:

a first generation submodule, configured to generate a symmetric verification key based on the first symmetric key and the second key parameter; and a verification submodule, configured to verify the second authentication code based on the symmetric verification key.

Optionally, the apparatus further includes:

a generation module (e.g., one or more processing circuits or computing processors), configured to generate a channel security key based on the first symmetric key and a first derived parameter, where the first derived parameter is determined based on the second key parameter;

an establishment module (e.g., one or more processing circuits or computing processors), configured to establish a first secure transport channel with the registration device based on the channel security key; and a negotiation module (e.g., one or more processing circuits or computing processors), configured to negotiate a second symmetric key with the registration device based on a second derived parameter by using the first secure transport channel, where the second symmetric key is used for network access identity authentication when the terminal device accesses the network to which the registration device belongs, and the second derived parameter is determined based on the second key parameter.

Optionally, the negotiation module includes:

a second generation submodule, configured to: generate a random number N4, and send N4 to the registration device by using the first secure transport channel, where N4 is used for the registration device to generate the second symmetric key based on N4 and a second negotiation key, and to generate third authentication code based on N4 and the second symmetric key, where the second negotiation key is generated by the authorization device based on the second derived parameter and is sent to the registration device;

a third generation submodule, configured to generate the second symmetric key based on N4 and the second derived parameter;

a first receiving submodule, configured to receive a first negotiation acknowledgement message sent by the registration device, where the first negotiation acknowledgement message carries the third authentication code; and a first update submodule, configured to: verify the third authentication code based on the second symmetric key and N4 that are generated by the terminal device, and update, after verification succeeds, the second symmetric key to a device key between the terminal device and the registration device, and send a second negotiation acknowledgement message to the registration device, where the second negotiation acknowledgement message indicates to the registration device to update the second symmetric key to the device key between the registration device and the terminal device.

Optionally, the negotiation module includes:

a second receiving submodule, configured to receive a random number N5 sent by the registration device by using the first secure transport channel, where N5 is randomly generated by the registration device, and N5 is used for the registration device to generate the second symmetric key based on N5 and the second negotiation key, and to update the second symmetric key to a device key between the registration device and the terminal device; and a second update submodule, configured to: generate the second symmetric key based on N5 and the second derived parameter, and update the second symmetric key to the device key between the terminal device and the registration device.

According to a sixth aspect, an identity authentication apparatus is provided. The identity authentication apparatus has a function of a behavior of implementing the identity authentication method in the third aspect. The identity authentication apparatus includes one or more modules. The one or more modules are configured to implement the identity authentication method provided in the third aspect.

To be specific, an identity authentication apparatus is provided. The apparatus is applied to a registration device, and the apparatus includes:

a first receiving module (e.g., one or more processing circuits or computing processors), configured to receive a first authentication request, where the first authentication request carries a first authentication code, the first authentication code is generated by a terminal device based on a first symmetric key, and the terminal device and an authorization device share the first symmetric key;

a first sending module (e.g., one or more processing circuits or computing processors), configured to: generate a second authentication request based on the first authentication request, and send the second authentication request to the authorization device, where the second authentication request carries the first authentication code;

a second receiving module (e.g., one or more processing circuits or computing processors), configured to: receive a first authentication acknowledgement message, where the first authentication acknowledgement message is determined after verification performed by the authorization device on the first authentication code based on the first symmetric key and an ownership relationship record of the terminal device succeeds, the authorization device stores the ownership relationship record, the ownership relationship record describes a binding relationship between the terminal device and a current owner of the terminal device, the first authentication acknowledgement message indicates to authorize an ownership relationship between the terminal device and a network to which the registration device belongs, the first authentication acknowledgement message carries a second authentication code, and the second authentication code is generated based on the first symmetric key; and a second sending module (e.g., one or more processing circuits or computing processors), configured to: determine a second authentication acknowledgement message based on the first authentication acknowledgement message, and send the second authentication acknowledgement message to the terminal device, where the second authentication acknowledgement message carries the second authentication code, and the second authentication acknowledgement message indicates to the terminal device to determine, after verification on the second authentication code based on the first symmetric key succeeds, that bidirectional identity authentication of the terminal device and the registration device succeeds.

Optionally, the first authentication request further carries a first ID, the first ID is an ID configured by an original owner of the terminal device for the terminal device, the second authentication request further carries the first ID in the first authentication request, the second authentication request further carries first identity information, and the first identity information includes at least one of identity information of the registration device or identity information of the network to which the registration device belongs.

Optionally, the second authentication request further carries an identity signature of the registration device, and the identity signature of the registration device is a signature conducted by the registration device on the first authentication request and the first identity information by using a private key.

Optionally, the identity information of the registration device includes at least one of a digital certificate related to an identity of the registration device or a digest of the digital certificate related to the identity of the registration device.

Optionally, the first authentication acknowledgement message further carries key update information, the key update information is encrypted and protected by using a symmetric key shared by the registration device and the authorization device, or the key update information is encrypted and protected by using a public key of the registration device.

The apparatus further includes:

an obtaining module (e.g., one or more processing circuits or computing processors), configured to obtain a channel security key from the key update information;

an establishment module (e.g., one or more processing circuits or computing processors), configured to establish a first secure transport channel with the terminal device based on the channel security key; and a negotiation module (e.g., one or more processing circuits or computing processors), configured to negotiate a second symmetric key with the terminal device based on the key update information by using the first secure transport channel, where the second symmetric key is used for network access identity authentication when the terminal device accesses the network to which the registration device belongs.

According to a seventh aspect, an identity authentication apparatus is provided. The identity authentication apparatus has a function of a behavior of implementing the identity authentication method in the fourth aspect. The identity authentication apparatus includes one or more modules. The one or more modules are configured to implement the identity authentication method provided in the fourth aspect.

To be specific, an identity authentication apparatus is provided. The apparatus is applied to an authorization device, the authorization device and a terminal device share a first symmetric key, the authorization device stores an ownership relationship record of the terminal device, and the ownership relationship record describes a binding relationship between the terminal device and a current owner of the terminal device. The apparatus includes:

a receiving module, configured to receive a second authentication request, where the second authentication request carries a first authentication code, and the first authentication code is generated by the terminal device based on the first symmetric key;

a first verification module, configured to verify the first authentication code based on the first symmetric key and the ownership relationship record; and a sending module, configured to send, by the authorization device, a first authentication acknowledgement message after verification succeeds, where the first authentication acknowledgement message indicates to authorize an ownership relationship between the terminal device and a network to which the registration device belongs, the first authentication acknowledgement message carries a second authentication code, the second authentication code is generated based on the first symmetric key, and the second authentication code indicates to the terminal device to determine, after verification on the second authentication code based on the first symmetric key succeeds, that bidirectional identity authentication of the terminal device and the registration device succeeds.

Optionally, the second authentication request further carries a first ID, a first key parameter, and first identity information, the first key parameter is generated by the terminal device, the first identity information includes at least one of identity information of the registration device or identity information of the network to which the registration device belongs, the first ID is an ID configured by an original owner of the terminal device for the terminal device, and the ownership relationship record includes a mapping relationship between the first ID and the first identity information.

The apparatus further includes:

a second verification module, configured to verify the first ID and the first identity information based on the ownership relationship record.

The first verification module includes:

a verification submodule, configured to verify the first authentication code based on the ownership relationship record, the first ID, the first symmetric key, and the first key parameter.

Optionally, the first authentication acknowledgement message further carries a second key parameter, the second key parameter includes plaintext or ciphertext of a second AV, and the ciphertext of the second AV is obtained by using the key shared by the authorization device and the terminal device.

The second AV includes a second anti-replay attack parameter, the second authentication code is generated based on the first symmetric key and the second AV, and the first authentication acknowledgement message is further used for the terminal device to verify the second authentication code based on the first symmetric key and the second key parameter.

Optionally, the first authentication acknowledgement message further carries key update information, and the key update information is generated based on the first symmetric key and the second AV.

The key update information is used for the registration device to obtain a channel security key required for establishing a first secure transport channel with the terminal device, and to negotiate a second symmetric key with the terminal device by using the first secure transport channel, the second key parameter is further used for the terminal device to generate the channel security key, and to negotiate the second symmetric key with the registration device by using the first secure transport channel, and the second symmetric key is used for network access identity authentication when the terminal device accesses the network to which the registration device belongs.

According to an eighth aspect, an identity authentication device is provided. The identity authentication device includes a processor and a memory. The memory is configured to: store a program for performing the identity authentication method provided in the second aspect, the third aspect, or the fourth aspect, and store data used to implement the identity authentication method provided in the second aspect, the third aspect, or the fourth aspect. The processor is configured to execute the program stored in the memory. An operation apparatus of the storage device may further include a communication bus, and the communication bus is configured to establish a connection between the processor and the memory.

According to a ninth aspect, a computer-readable storage medium is provided. The computer-readable storage medium stores instructions. When run on a computer, the instructions enable the computer to perform the identity authentication method in the second aspect, the third aspect, or the fourth aspect.

According to a tenth aspect, a computer program product including instructions is provided. When run on a computer, the computer program product enables the computer to perform the identity authentication method in the second aspect, the third aspect, or the fourth aspect.

Technical effects achieved in the first aspect, the third aspect, the fourth aspect, the fifth aspect, the sixth aspect, the seventh aspect, the eighth aspect, the ninth aspect, and the tenth aspect are similar to technical effects achieved by corresponding technical means in the second aspect, and details are not described herein again.

The technical solutions provided in embodiments of this application can bring at least the following beneficial effects:

In embodiments of this application, a symmetric key based identity verification method is implemented by sharing the first symmetric key between the terminal device and the authorization device. In this way, when confidentiality of the symmetric key is ensured, authentication code generated based on the symmetric key in an entire identity authentication process is not easily forged, so that security and reliability of identity authentication can be ensured. In addition, in this solution, bidirectional identity authentication of the terminal device and the registration device is implemented by using the authorization device, to avoid a security issue of unidirectional identity authentication. That is, security of this solution is higher.

DESCRIPTION OF EMBODIMENTS

To make the objectives, technical solutions, and advantages of embodiments of this application clearer, the following further describes the implementations of this application in detail with reference to the accompanying drawings.

A network architecture and a service scenario described in embodiments of this application are intended to describe the technical solutions in embodiments of this application more clearly, and do not constitute a limitation on the technical solutions provided in embodiments of this application. A person of ordinary skill in the art may learn that, with evolution of the network architecture and emergence of new service scenarios, the technical solutions provided in embodiments of this application are also applicable to similar technical problems.

Figure 1:
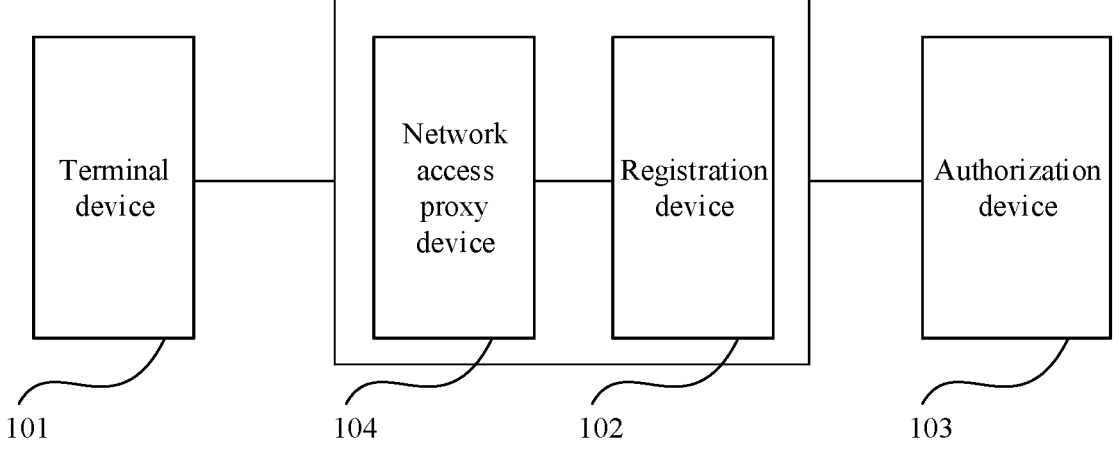
FIG. 1 is a diagram of a system architecture related to an identity authentication method according to an embodiment of this application.

FIG. 1 is a diagram of a system architecture related to an identity authentication method according to an embodiment of this application. With reference to FIG. 1, the system architecture includes a terminal device 101, a registration device 102, and an authorization device 103. The terminal device 101 and the registration device 102 can be connected to the registration device 102 in a wired or wireless manner to communicate with each other, and the registration device 102 can be connected to the authorization device 103 in a wired or wireless manner to communicate with each other.

The terminal device 101 is configured to send a first authentication request to the registration device 102, where the first authentication request carries a first authentication code, and the first authentication code is generated based on a first symmetric key.

In some embodiments of this application, the first symmetric key is implanted into the terminal device 101 before delivery of the terminal device 101. The first symmetric key is a device key shared by the terminal device 101 and the authorization device 103, and the first symmetric key is used as a symmetric key. In some embodiments of this application, bidirectional identity authentication of the terminal device 101 and the registration device 102 is implemented based on the symmetric key.

Optionally, a first ID is further implanted into the terminal device 101 before delivery of the terminal device 101, the first ID is an ID configured by an owner (e.g., the original owner or true owner) of the terminal device 101 for the terminal device 101, and the first authentication request further carries the first ID.

The registration device 102 is configured to: receive the first authentication request sent by the terminal device 101, generate a second authentication request based on the first authentication request, and send the second authentication request to the authorization device 103. For example, when the first authentication request does not carry identity information of the registration device 102, the registration device 102 adds the identity information of the registration device 102 to the first authentication request, to obtain the second authentication request.

Optionally, the registration device 102 stores a purchase record of the terminal device 101. The registration device 102 verifies, based on the purchase record, the first ID carried in the first authentication request, generates the second authentication request based on the first authentication request after verification succeeds, and sends the second authentication request to the authorization device 103.

The authorization device 103 stores an ownership relationship record of the terminal device 101. The ownership relationship record describes a binding relationship between the terminal device and the current owner of the terminal device. After receiving the second authentication request, the authorization device 103 is configured to verify the second authentication request based on the first symmetric key and the ownership relationship record, for example, verify the first ID and the identity information of the registration device based on the ownership relationship record, and verify the first authentication code based on the ownership relationship record and the first symmetric key. After verification succeeds, the authorization device 103 sends a first authentication acknowledgement message to the registration device 102. The first authentication acknowledgement message indicates to authorize an ownership relationship between the terminal device 101 and a network to which the registration device 102 belongs. The first authentication acknowledgement message carries a second authentication code, and the second authentication code is generated based on the first symmetric key.

The registration device 102 is further configured to: after receiving the first authentication acknowledgement message sent by the authorization device 103, determine identity validity of the terminal device, determine a second authentication acknowledgement message based on the first authentication acknowledgement message, and send the second authentication acknowledgement message to the terminal device 101, where the second authentication acknowledgement message carries the second authentication code.

The terminal device 101 is further configured to: receive the second authentication acknowledgement message sent by the registration device 102, verify, based on the first symmetric key, the second authentication code carried in the second authentication acknowledgement message, and determine, after verification succeeds, that bidirectional identity authentication of the terminal device 101 and the registration device 102 succeeds.

Optionally, the identity authentication process may be considered as a mutual trust based authorization phase.

Optionally, the terminal device 101 is further configured to: after deployment, search for the registration device 102 by using a network, after finding the registration device 102, first send a network access request to the registration device 102, and after the registration device 102 responds to the terminal device 101 based on the network access request, generate the first authentication request. To be specific, before the mutual trust based authorization phase, a network access discovery phase is further included.

Optionally, the terminal device 101 may not support an Internet protocol (IP) stack, that is, does not have a function of generating an IP packet, for example, some IoT devices that do not support the IP protocol stack. In this case, the system architecture further includes a network access proxy device 104, and the network access proxy device 104 communicates with the registration device 102 in a wired or wireless manner. After the terminal device 101 finds the network access proxy device 104, by using a network, and connects to the network access proxy device 104, the terminal device 101 sends a message to the registration device 102 by using the network access proxy device 104. The network access proxy device 104 is configured to: receive the message sent by the terminal device 101 to the registration device 102, encapsulate the message into an IP packet, and forward the IP packet to the registration device 102. The network access proxy device 104 is further configured to: receive and forward a message sent by the registration device 102 to the terminal device 101, to facilitate network communication between the terminal device 101 and the registration device 102.

Optionally, regardless of whether the terminal device 101 supports the IP stack, the system architecture may further include the network access proxy device 104, that is, communication between the terminal device 101 and the registration device 102 is implemented by using the network access proxy device 104.

Optionally, the terminal device 101 is further configured to: after determining that bidirectional identity authentication of the terminal device 101 and the registration device 102 succeeds, establish a first secure transport channel with the registration device 102 to negotiate a second symmetric key, where the second symmetric key is used for network access identity authentication when the terminal device 101 accesses the network to which the registration device 102 belongs.

In other words, the first symmetric key is used as an old device key, and the old device key is shared only between the terminal device 101 and the authorization device 103, and is used to implement the foregoing bidirectional identity authentication by using the authorization device 103. The second symmetric key is used as a new device key negotiated between the terminal device 101 and the registration device 102, and the new device key is shared only between the terminal device 101 and the registration device 102, and is used for network access identity authentication when the terminal device 101 accesses the network to which the registration device 102 belongs.

Optionally, the terminal device 101 is further configured to: after negotiating the second symmetric key with the registration device 102, receive at least one of a second ID, configuration information, or the like that are delivered by the registration device 102. The registration device 102 is further configured to: after negotiating the second symmetric key with the registration device 102, deliver at least one of the second ID, the configuration information, or the like to the terminal device 101. The second ID is a new identity allocated by the current owner of the terminal device 101 to the terminal device 101, the configuration information is a configuration file delivered by the current owner of the terminal device 101 to the terminal device 101, and the second ID delivered by the registration device 102 is also used for network access identity authentication when the terminal device 101 accesses the network to which the registration device 102 belongs.

Optionally, the system architecture further includes a controller, and the controller is connected to the registration device 102 in a wired or wireless manner to perform communication. The registration device 102 is further configured to send a configuration request to the controller after negotiating the second symmetric key. The controller is configured to: after receiving the configuration request, generate the second ID, and send the second ID, the configuration information, and the like to the registration device 102. The registration device 102 delivers the second ID, the configuration information, and the like to the terminal device 101. Alternatively, the controller is configured to directly send the second ID, the configuration information, and the like to the terminal device 101 after receiving the configuration request. Optionally, the configuration request carries the first ID and the second symmetric key, and the controller is further configured to: store, manage, and maintain a mapping relationship between the terminal device and a corresponding device key, for example, correspondingly store the first ID, the second ID, and the second symmetric key.

Optionally, the foregoing process of establishing the first secure transport channel to negotiate the second symmetric key and subsequently delivering the second ID, the configuration information, and the like may be considered as an enrollment over secure transport (EST) phase. To be specific, after the mutual trust based authorization phase, an EST phase is further included.

It should be noted that, this embodiment of this application is described only by using an identity authentication process of one terminal device 101 as an example. The system architecture may include a plurality of terminal devices 101. For example, the plurality of terminal devices 101 are a batch of Internet of Things devices purchased by a campus or an enterprise. After each of the plurality of terminal devices 101 is deployed, identity authentication may be performed by using the registration device 102 and the authorization device 103 based on the method described above.

Optionally, the system architecture includes a plurality of registration devices 102. Each of the plurality of registration devices 102 is configured to perform identity authentication on at least one of the plurality of terminal devices 101. The controller is configured to communicate with the plurality of registration devices 102. Management and delivery of new IDs and configuration information of the plurality of terminal devices 101 are uniformly processed by the controller. The plurality of registration devices 102 need to apply to the controller for new IDs and configuration information in place of the plurality of terminal devices 101. The plurality of registration devices 102 are further configured to send a new device key (the second symmetric key) to the controller for unified maintenance and management.

In some embodiments of this application, the terminal device 101 is any one of an Internet of Things (IoT) device, a router, a switch, a mobile phone, a personal computer (PC), and the like. The registration device 102 is a device such as a server or a gateway device. The authorization device 103 is a server. The server is a server, a server cluster including a plurality of servers, or a cloud computing service center.

The network access proxy device 104 is a switch, a router, a wireless fidelity (Wi-Fi) device, or the like.

Figure 2:
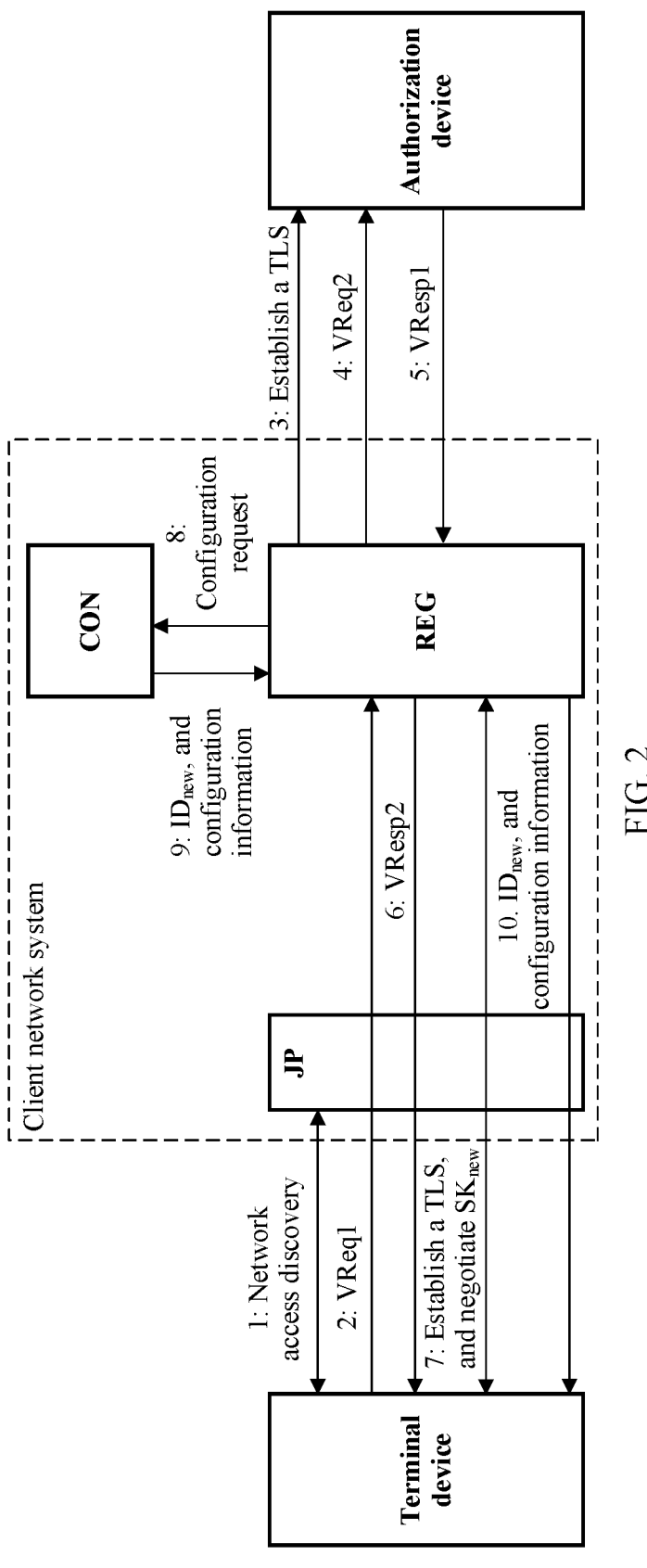
FIG. 2 is a diagram of a system architecture related to another identity authentication method according to an embodiment of this application.

FIG. 2 is a diagram of a system architecture related to another identity authentication method according to an embodiment of this application. The system architecture includes a terminal device, a network access proxy device (join proxy, JP), a registration device (register, REG), a controller (CON), and an authorization device. Optionally, the JP, the REG, and the CON may be considered as a client network system.

An embodiment of an identity authentication method provided in an embodiment of this application is briefly described below with reference to FIG. 2.

In some embodiments of this application, the terminal device and the authorization device share a first symmetric key ($SK_{old}$), and the authorization device stores an ownership relationship record of the terminal device. Optionally, the registration device stores a purchase record of the terminal device.

1. The terminal device finds the JP through network access discovery.

2. The terminal device sends a first authentication request (VReq1) to the REG by using the JP, where the first authentication request carries a first authentication code, and the first authentication code is generated based on $SK_{old}$.

3. A transport layer security (TLS) channel is established between the REG and the authorization device.

4. The REG sends a second authentication request (VReq2) to the authorization device by using the TLS channel, where the second authentication request carries the first authentication code. Optionally, the registration device first verifies the first authentication request based on the purchase record.

5. The authorization device verifies the second authentication request based on $SK_{old}$ and the ownership relationship record, and after verification succeeds, sends a first authentication acknowledgement message (VResp1) to the registration device in response, where the first authentication acknowledgement message carries a second authentication code, the second authentication code is generated based on $SK_{old}$, and the first authentication acknowledgement message indicates an ownership relationship between the terminal device and a network to which the registration device belongs.

6. The REG determines a second authentication acknowledgement message (VResp2) based on the response of the authorization device, and sends the second authentication acknowledgement message to the terminal device by using the JP. After the terminal device verifies the second authentication acknowledgement message, bidirectional identity authentication succeeds.

7. Optionally, based on the response of the authorization device, the terminal device establishes a TLS channel and negotiates a second symmetric key ($SK_{new}$) with the REG.

8. The REG sends a configuration request to the CON.

9. The CON sends a second ID ($ID_{new}$) and configuration information to the REG in response.

10. The REG delivers $ID_{new}$ and the configuration information to the terminal device by using the JP.

Figure 3:
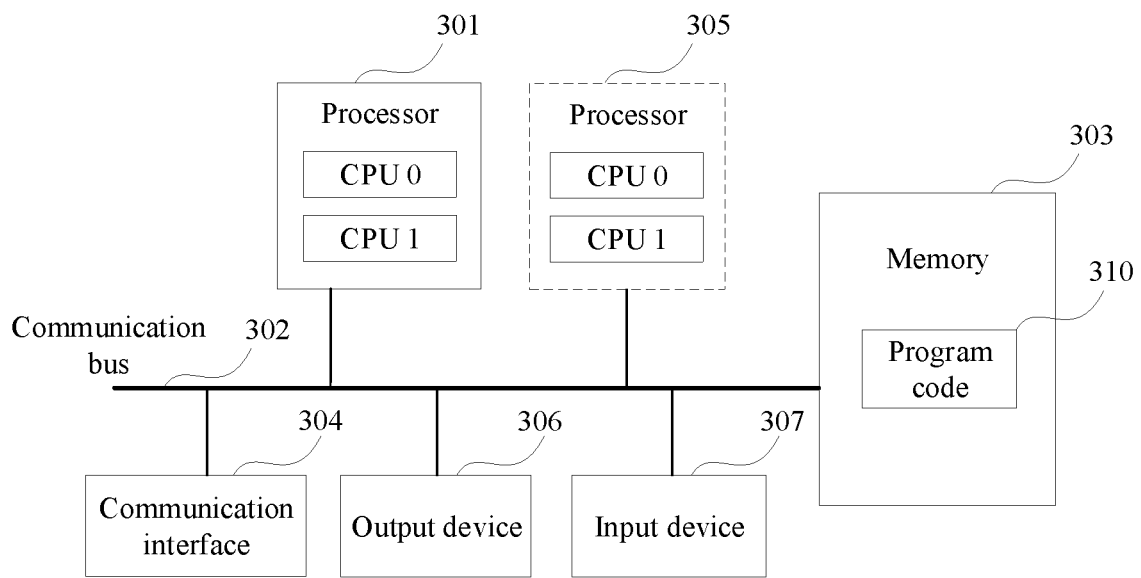
FIG. 3 is a schematic diagram of a structure of a computer device according to an embodiment of this application.

FIG. 3 is a schematic diagram of a structure of a computer device according to an embodiment of this application. Optionally, the computer device is the terminal device 101, the registration device 102, or the authorization device 103 shown in FIG. 1 or FIG. 2. The computer device includes one or more processors 301, a communication bus 302, a memory 303, and one or more communication interfaces 304.

The processor 301 is a general-purpose central processing unit (CPU), a network processor (NP), a microprocessor, or one or more integrated circuits configured to implement solutions of this application, for example, an application-specific integrated circuit (ASIC), a programmable logic device (PLD), or a combination thereof. Optionally, the PLD is a complex programmable logic device (CPLD), a field-programmable gate array (FPGA), a generic array logic (GAL), or any combination thereof.

The communication bus 302 is configured to transmit information between the components. Optionally, the communication bus 302 is classified into an address bus, a data bus, a control bus, and the like. For ease of representation, in the figure, only one thick line is used to represent the system bus, but it does not mean that there is only one bus or one type of bus For example, the memory 303 is a read-only memory (ROM), a random access memory (RAM), an electrically erasable programmable read-only memory (EEPROM), an optical disc (including a compact disc read-only memory (CD-ROM), a compact disc, a laser disc, a digital versatile disc, a Blu-ray disc, and the like), a disk storage medium or another magnetic storage device, or any other medium that can be used for carrying or storing expected program code in a form of an instruction or a data structure and that can be accessed by a computer, but is not limited thereto. The memory 303 exists independently, and is connected to the processor 301 by using the communication bus 302, or the memory 303 and the processor 301 are integrated together.

The communication interface 304 uses any apparatus such as a transceiver, and is configured to communicate with another device or a communication network. The communication interface 304 includes a wired communication interface, and optionally, further includes a wireless communication interface. The wired communication interface is, for example, an Ethernet interface. Optionally, the Ethernet interface is an optical interface, an electrical interface, or a combination thereof. The wireless communication interface is a wireless local area network (WLAN) interface, a cellular network communication interface, or a combination thereof.

Optionally, in some embodiments, the computer device includes a plurality of processors, for example, the processor 301 and the processor 305 shown in FIG. 3. Each of the processors is a single-core processor or a multi-core processor. Optionally, the processor herein is one or more devices, circuits, and/or processing cores configured to process data (for example, computer program instructions).

In a specific implementation, in an embodiment, the computer device further includes an output device 306 and an input device 307. The output device 306 communicates with the processor 301, and can display information in a plurality of manners. For example, the output device 306 is a liquid crystal display (LCD), a light emitting diode (LED) display device, a cathode ray tube (CRT) display device, a projector, or the like. The input device 307 communicates with the processor 301, and can receive an input of a user in a plurality of manners. For example, the input device 307 is a mouse, a keyboard, a touchscreen device, a sensor device, or the like.

In some embodiments, the memory 303 is configured to store program code 310 for executing the solutions of this application, and the processor 301 can execute the program code 310 stored in the memory 303. The program code 310 includes one or more software modules, and the computer device can implement, by using the processor 301 and the program code 310 in the memory 303, the identity authentication method provided in the following embodiment in FIG. 4

Figure 4:
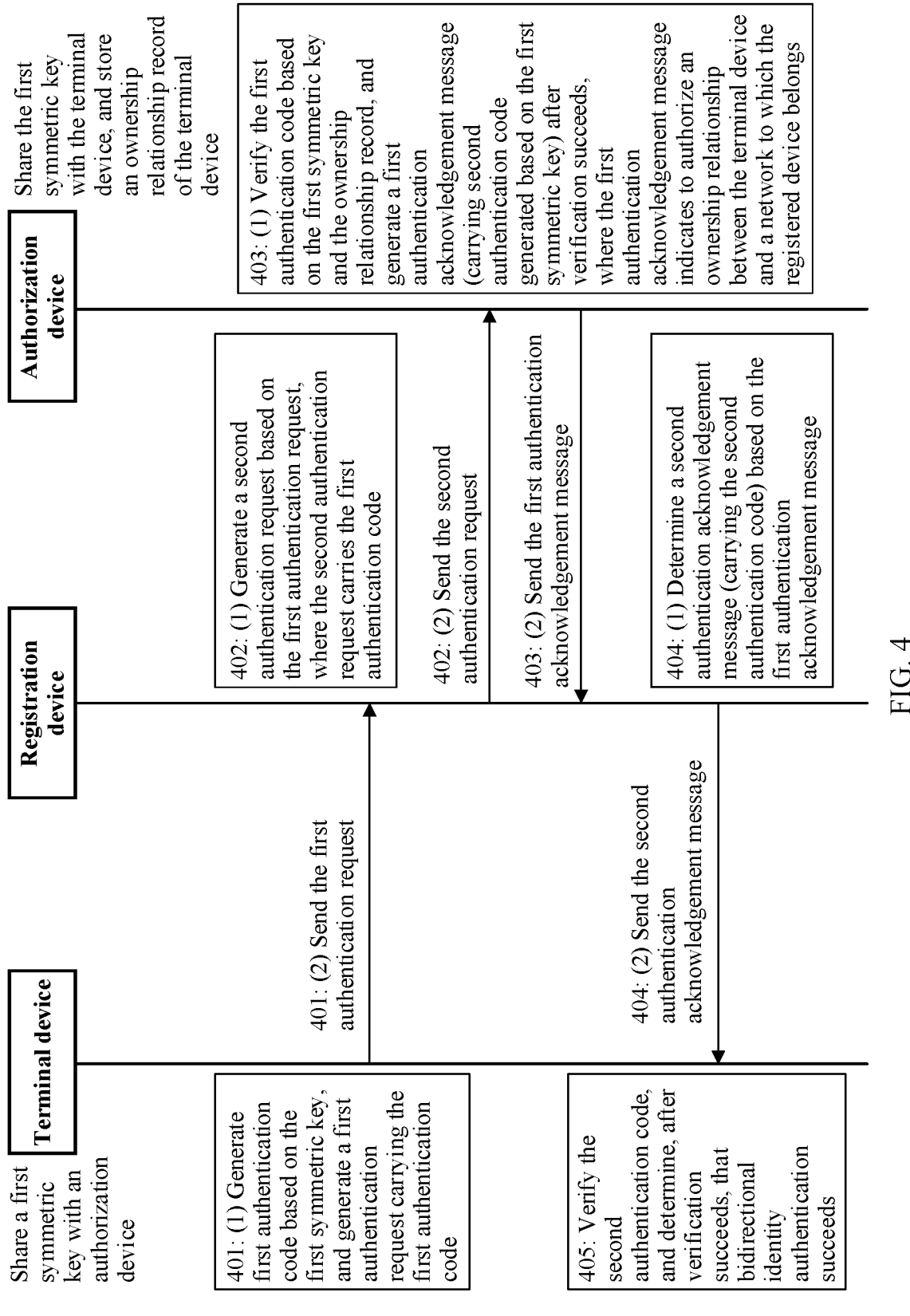
FIG. 4 is a flowchart of an identity authentication method according to an embodiment of this application.

FIG. 4 is a flowchart of an identity authentication method according to an embodiment of this application. With reference to FIG. 4, the method includes the following steps.

Step 401: A terminal device sends a first authentication request to a registration device, where the first authentication request carries a first authentication code, the first authentication code is generated based on a first symmetric key, and the first symmetric key is a key shared by the terminal device and an authorization device.

In some embodiments of this application, the terminal device and the authorization device share the first symmetric key. To be specific, the first symmetric key is implanted into the terminal device when the terminal device is delivered from a factory. For example, the first symmetric key is implanted into hardware or firmware of the terminal device.

As a symmetric key, the first symmetric key is used to implement bidirectional identity authentication of the terminal device and the registration device by using the authorization device. In other words, this embodiment of this application provides an identity authentication mechanism based on a symmetric cryptographic technology, so that a terminal device in a campus network or an enterprise network can securely access a network.

In some embodiments of this application, the terminal device generates the first authentication code based on the first symmetric key, and generates the first authentication request based on the first authentication code, where the first authentication request carries the first authentication code; and the terminal device sends the first authentication request to the registration device. In some other embodiments, the authentication code may also be referred to as message authentication code, a message signature, or the like. Optionally, the terminal device sends the first authentication request to the registration device by using a network access proxy device.

It should be noted that, in some embodiments of this application, there are many implementations in which the terminal device generates, based on the first symmetric key, the first authentication request that carries the first authentication code. The following describes one of the implementations in detail.

In some embodiments of this application, the first authentication code is generated based on the first symmetric key, a first ID, and a first AV. The first ID is an ID configured by an original owner of the terminal device for the terminal device, and the original owner is a manufacturer, an integrator, or the like of the terminal device. The first ID is further implanted into the terminal device when the terminal device is delivered from the factory. For example, the first ID is implanted into the hardware or the firmware of the terminal device. The first AV includes a first random parameter and a first anti-replay attack parameter, the first random parameter is generated by the terminal device, and the first random parameter includes at least one of a first random number N1 or a second random number N2.

Optionally, the first authentication request further carries the first ID and a first key parameter, the first key parameter includes plaintext or ciphertext of the first AV, and the ciphertext of the first AV is encrypted by using the key shared by the terminal device and the authorization device.

In some embodiments of this application, the terminal device first generates at least one of the random numbers N1 or N2 used to derive a key, generates a first anti-replay attack parameter CT, and then generates the first AV. The first AV includes at least one of N1 and N2, and the first anti-replay attack parameter. The terminal device generates the first key parameter based on the first AV. The first key parameter includes the plaintext or the ciphertext of the first AV. That is, the first key parameter includes the first AV or includes an encrypted first AV. Then, the terminal device determines input data of a first secure hash algorithm based on the first ID and the first AV, determines an input key of the first secure hash algorithm based on the first symmetric key, and processes the determined input data based on the first secure hash algorithm by using the determined input key, to obtain the first authentication code.

Optionally, the first secure hash algorithm is a key-related hash operation authentication code (HMAC) algorithm, and the HMAC algorithm may be implemented by using an algorithm such as a secure hash algorithm (SHA) 256, an SHA512, or a domestic hash algorithm SM3.

Optionally, the terminal device uses the first symmetric key as an input key of the first secure hash algorithm, or the terminal device generates a derived key based on the first symmetric key and a key derivation algorithm, and uses the derived key as the input key of the first secure hash algorithm. The key derivation algorithm is implemented by using a key derivation function (KDF), an HMAC-based KDF (HKDF), and the like. For example, the terminal device generates the derived key based on the first symmetric key, the first random parameter (at least one of N1 or N2), and the key derivation algorithm. Optionally, the terminal device uses the first ID and the first AV as the input data of the first secure hash algorithm.

It should be noted that, when the first key parameter carries the encrypted first AV, a probability that the first key parameter is stolen and leaked can be reduced, and identity authentication security can be improved. Optionally, the terminal device generates a symmetric crypto key based on the first symmetric key and the key derivation algorithm, and the terminal device encrypts the first AV by using the symmetric crypto key, to obtain the first key parameter.

Optionally, the terminal device generates a random number NO, and generates the symmetric crypto key based on the first symmetric key, NO, and the key derivation algorithm. The terminal device encrypts the first AV by using the symmetric crypto key, to obtain the first key parameter. In this case, the terminal device determines the input data of the first secure hash algorithm based on the first ID, the first AV, and NO, and the first authentication request further carries NO. The key derivation algorithm may be implemented by using the KDF, the HKDF, and the like. Optionally, an encryption function used by the terminal device to encrypt the first AV may be implemented by using a symmetric cryptographic algorithm such as an advanced encryption standard (AES) and SM4.

It can be learned from the foregoing description of the system architecture shown in FIG. 1 that, after deployment, the terminal device first searches for the registration device by using a network. After finding the registration device, the terminal device first sends a network access request to the registration device. After the registration device responds to the terminal device based on the network access request, the terminal device generates the first authentication request.

To be specific, before the terminal device sends the first authentication request to the registration device, the terminal device first sends the network access request to the registration device, and the terminal device receives a first acknowledgement message sent by the registration device. The first acknowledgement message carries first identity information. The first identity information includes at least one of identity information of the registration device or identity information of a network to which the registration device belongs. The identity information of the registration device includes at least one of a digital certificate related to an identity of the registration device and a digest of the digital certificate related to the identity of the registration device. Optionally, the process may be considered as a network access discovery phase before the terminal device sends the first authentication request.

When the first acknowledgement message carries the first identity information, the first authentication code is generated based on the first symmetric key, the first ID, the first AV, and the first identity information, and the first authentication request further carries the first identity information. For example, the terminal device uses the first ID, the first AV, and the first identity information as the input data of the first secure hash algorithm, to generate the first authentication code.

For example, when the first acknowledgement message carries the digital certificate related to the identity of the registration device, the terminal device uses the first ID, the first AV, and the digital certificate related to the identity of the registration device as the input data of the first secure hash algorithm. In this case, the first authentication request further carries the digital certificate related to the identity of the registration device. When the first acknowledgement message carries the digest of the digital certificate of the registration device, the terminal device uses the first ID, the first AV, and the digest of the digital certificate related to the identity of the registration device as the input data of the first secure hash algorithm. In this case, the first authentication request further carries the digest of the digital certificate related to the identity of the registration device.

It should be noted that, in some embodiments of this application, to improve identity authentication security, the identity authentication method provided in some embodiments of this application can further prevent a replay attack. It can be learned from the foregoing description that the first AV includes the first anti-replay attack parameter. In other words, to prevent a replay attack, the terminal device can generate the first anti-replay attack parameter.

Optionally, in some embodiments of this application, an anti-replay attack manner is any one of a random number based manner, a timestamp based manner, a counter based manner, a random number and timestamp based manner, and the like. Correspondingly, the first anti-replay attack parameter is one of a third random number, a first timestamp, a first count value, and the third random number attached with the first timestamp. The first timestamp is a moment at which the terminal device generates the first anti-replay attack parameter.

Optionally, the first authentication request further carries a uniform resource locator (URL) of the authorization device, and the URL carried in the first authentication request is used by the registration device to communicate with the authorization device corresponding to the URL to perform identity authentication.

Example 1: A process in which the terminal device generates the first authentication request VReq1 includes:

1: Generate random numbers N0=Rand( ), N1=Rand( ), and N2=Rand( ), where Rand( ) is a secure and standard pseudo-random number generation function. Generate the first anti-replay attack parameter $CT_1$.

2: Generate a symmetric verification key $Key_I$=HKDF ($SK_{old}$, N1), where HKDF( ) may be a secure key derivation algorithm implemented based on SHA256.

3: Generate a symmetric crypto key $Key_C$=HKDF($SK_{old}$, N0).

4: Generate the first authentication vector $AV_1$={N1, N2, CT}, where $AV_1$ includes N1, N2, and $CT_1$.

5: Encrypt $AV_1$ by using $Key_C$, to obtain $EAV_1$-E ($Key_C$, $AV_1$), where E( ) may be a symmetric encryption algorithm implemented based on SM4.

6: Calculate the first authentication code AuthC=HMAC ($Key_I$, ($ID_{old}$, CertR, N1, N2)), where $ID_{old}$ is the first ID, and CertR is the first identity information.

7: Obtain the first authentication request VReq1 that carries $ID_{old}$, N0, $EAV_1$, CertR, the URL of the authorization device (optional), and AuthC.

It can be learned from the foregoing description that, the first authentication request carries the first ID, the first key parameter (an encrypted or unencrypted first AV), the first identity information (optional), the URL of the authorization device (optional), the first authentication code, and NO (optional). The first AV includes the first random parameter and the first anti-replay attack parameter.

Step 402: The registration device receives the first authentication request, generates a second authentication request based on the first authentication request, and sends the second authentication request to the authorization device, where the second authentication request carries the first authentication code.

In some embodiments of this application, after receiving the first authentication request, the registration device generates the second authentication request based on the first authentication request, and sends the second authentication request to the authorization device. The second authentication request carries the first authentication code. For example, the registration device directly forwards the first authentication request as the second authentication request to the authorization device.

Optionally, in some embodiments of this application, the registration device stores a purchase record of the terminal device. When the first authentication request carries the first ID, the registration device verifies, based on the purchase record, the first ID carried in the first authentication request. If the first ID is included in the purchase record, the registration device determines that the terminal device belongs to a range of devices purchased by a campus or an enterprise, generates the second authentication request based on the first authentication request, and sends the second authentication request to the authorization device. The purchase record includes IDs of all terminal devices purchased by a purchaser (for example, the campus or the enterprise). Optionally, the purchase record is stored in a purchase database, and the registration device may obtain the purchase record from the purchase database.

In some embodiments of this application, when the first authentication request carries the first ID, the second authentication request further carries the first ID in the first authentication request. The second authentication request further carries the first identity information, and the first identity information includes at least one of the identity information of the registration device or the identity information of the network to which the registration device belongs. When the first authentication request does not carry the first identity information, the registration device adds the first identity information to the first authentication request, to obtain the second authentication request. When the first authentication request carries the first identity information, the registration device uses the first authentication request as the second authentication request.

For example, if the first authentication request carries the digital certificate related to the identity of the registration device, the registration device uses the first authentication request as the second authentication request, or the registration device adds, to the first authentication request, the identity information of the network to which the registration device belongs, to obtain the second authentication request. If the first authentication request carries the digest of the digital certificate related to the identity of the registration device, the registration device uses the first authentication request as the second authentication request, or the registration device adds, to the first authentication request, the digital certificate related to the identity and the identity information of the network to which the registration device belongs, to obtain the second authentication request.

Optionally, it can be learned from the foregoing description that the first authentication request further carries the first key parameter, and the first key parameter includes the plaintext or the ciphertext of the first AV. To prevent a replay attack, the first AV includes the first anti-replay attack parameter. In this case, the second authentication request also carries the first key parameter.

It can be learned from the foregoing description that, the URL of the authorization device is optionally carried in the first authentication request. Based on this, when the first authentication request does not carry the URL of the authorization device, the registration device obtains the URL of the authorization device from an authorization database based on the first ID. The authorization database stores a correspondence between URLs of a plurality of authorization devices and IDs of a plurality of terminal devices. For example, a URL of an authorization device corresponds to IDs of a batch of terminal devices sold by the authorization device. The registration device obtains, based on the correspondence, a URL corresponding to the first ID, and uses the obtained URL as a receiver of the second authentication request.

Optionally, if the first authentication request further carries the URL of the authorization device, the registration device may choose to delete, after obtaining the URL, the URL carried in the first authentication request. In this way, the obtained second authentication request does not carry the URL of the authorization device.

Optionally, to ensure security of communication between the registration device and the authorization device, a second secure transport channel (TLS channel) is established between the registration device and the authorization device based on the digital certificate of the registration device, and the registration device sends the second authentication request to the authorization device via the second secure transport channel. Alternatively, a message transmitted between the registration device and the authorization device needs to be encrypted based on a private key of the registration device (for example, a private key corresponding to a public key in the digital certificate), or encrypted based on the symmetric key shared by the registration device and the authorization device, to ensure communication security.

It should be noted that, before identity authentication at this time, if the authorization device does not obtain a public key of the registration device (for example, the public key in the digital certificate), or the authorization device does not share the symmetric key with the registration device, to ensure communication security, when the registration device does not establish the TLS channel with the authorization device, the registration device needs to ensure that the public key of the registration device is carried in the second authentication request, so as to send the public key to the authorization device. For example, when the first authentication request does not carry the digital certificate related to the identity of the registration device, the registration device adds the digital certificate related to the identity of the registration device to the first authentication request, to obtain the second authentication request.

Optionally, the second authentication request further carries an identity signature of the registration device, and the identity signature of the registration device is a signature created by the registration device on the first authentication request and the first identity information by using a private key. If the authorization device trusts the registration device, the second authentication request may alternatively not carry the identity signature of the registration device.

Example 2: Based on Example 1, a process in which the registration device determines the second authentication request after receiving the first authentication request includes:

1: Obtain $ID_{old}$ from VReq1, and verify $ID_{old}$ based on the purchase record, and if $ID_{old}$ does not exist in the purchase record, return an error. If $ID_{old}$ exists in the purchase record, proceed to a next step.

2: If VReq1 does not carry the first identity information, the registration device adds the first identity information to VReq1 to obtain VReq2. For example, if VReq1 does not carry the digital certificate related to the identity of the registration device, the registration device adds the digital certificate related to the identity of the registration device to VReq1 to obtain VReq2. Optionally, the registration device adds the identity signature of the registration device to VReq2.

It can be learned from the foregoing description that, the second authentication request carries the first ID, the first key parameter, the first authentication code, the first identity information (optionally carried when input data used to generate the first authentication code includes the first identity information), the URL of the authorization device (optionally), NO (optionally carried when carried in the first authentication request), and the identity signature of the registration device (optionally).

Step 403: The authorization device receives the second authentication request, verifies the first authentication code based on the first symmetric key and the ownership relationship record, and sends a first authentication acknowledgement message to the registration device after verification succeeds, where the first authentication acknowledgement message indicates to authorize an ownership relationship between the terminal device and the network to which the registration device belongs.

In some embodiments of this application, after receiving the second authentication request, the authorization device verifies, based on the first symmetric key and the stored ownership relationship record of the terminal device, the first authentication code carried in the second authentication request, and sends the first authentication acknowledgement message to the registration device after verification succeeds, where the first authentication acknowledgement message indicates to authorize the ownership relationship between the terminal device and the network to which the registration device belongs.

It should be noted that, the authorization device stores the ownership relationship record (for example, a sales record) of the terminal device, and the ownership relationship record describes a binding relationship between the terminal device and the current owner of the terminal device. For example, the ownership relationship record records a correspondence between IDs of all terminal devices sold by a seller and purchaser information, that is, the ownership relationship record includes a mapping relationship between the first ID and the first identity information. The authorization device further stores a key database. The key database stores a mapping relationship between IDs of all terminal devices sold by the seller and device keys. For example, the key database includes a mapping relationship between the first ID and the first symmetric key. Optionally, the authorization device does not store the key database, but records, in the ownership relationship record, device keys corresponding to IDs of terminal devices. That is, the ownership relationship record stores IDs of all terminal devices that have been sold by the seller, and a device key and purchaser information that correspond to each ID. The authorization device obtains, from the ownership relationship record, the first symmetric key corresponding to the first ID. In some embodiments of this application, the authorization device verifies the first authentication code based on the ownership relationship record, the first ID, the first symmetric key, and the first key parameter.

When the first authentication code is generated based on the first symmetric key, the first ID, and the first AV, after receiving the second authentication request, the authorization device obtains the first ID and the first key parameter from the second authentication request, obtains the first AV from the first key parameter, and verifies the first ID based on the ownership relationship record. After verification succeeds, the authorization device obtains, from the key database, the first symmetric key corresponding to the first ID. Optionally, when the ownership relationship record stores the IDs of all the terminal devices that have been sold by the seller, and the device key and the purchaser information that correspond to each ID, the authorization device obtains, from the ownership relationship record, the first symmetric key corresponding to the first ID. After obtaining the first symmetric key, the authorization device verifies the first authentication code based on the first symmetric key, the first ID, and the first AV.

For example, the authorization device determines the input key of the first secure hash algorithm based on the first symmetric key, uses the first ID and the first AV as the input data of the first secure hash algorithm, and processes the determined input data based on the first secure hash algorithm by using the determined input key, to obtain first check code. If the first check code is the same as the first authentication code, the authorization decides that verification succeeds; or if the first check code is different from the first authentication code, the authorization decides that the verification fails.

When the first authentication code is generated based on the first symmetric key, the first ID, the first AV, and the first identity information, the authorization device obtains the first ID and the first key parameter from the second authentication request, obtains the first AV from the first key parameter, obtains, from the ownership relationship record, the first identity information corresponding to the first ID, and obtains, from the key mapping database, the first symmetric key corresponding to the first ID. The authorization device verifies the first authentication code based on the first symmetric key, the first ID, the first AV, and the first identity information.

For example, the authorization device determines the input key of the first secure hash algorithm based on the first symmetric key, uses the first ID, the first AV, and the first identity information as the input data of the first secure hash algorithm, and processes the determined input data based on the first secure hash algorithm by using the determined input key, to obtain the first check code. If the first check code is the same as the first authentication code, the verification succeeds; or if the first check code is different from the first authentication code, the verification fails.

Optionally, when the terminal device uses the first symmetric key as the input key of the first secure hash algorithm, the authorization device also uses the first symmetric key as the input key of the first secure hash algorithm. When the terminal device generates the derived key based on the first symmetric key and the key derivation algorithm, and uses the derived key as the input key of the first secure hash algorithm, the authorization device also generates the derived key based on the first symmetric key and the key derivation algorithm, and uses the generated derived key as the input key of the first secure hash algorithm. In other words, the algorithm used by the authorization device to verify the first authentication code needs to be the same as the algorithm used by the terminal device to generate the first authentication code. This is a symmetric verification process, to ensure verification accuracy.

Optionally, when the second authentication request further carries the first ID and the first identity information, after receiving the second authentication request, the authorization device first verifies the first ID and the first identity information based on the ownership relationship record. For example, in some embodiments of this application, the authorization device needs to verify whether the first ID carried in the second authentication request is included in the ownership relationship record, and verify whether the first identity information carried in the first authentication request is consistent with the first identity information corresponding to the first ID recorded in the ownership relationship record. After determining that the two verifications both succeed, the authorization device obtains the first symmetric key from the key database based on the first ID, obtains the first key parameter from the second authentication request, obtains the first AV from the first key parameter, and verifies the first authentication code based on the first symmetric key, the first ID, the first AV, the first identity information, and the first secure hash algorithm.

Optionally, when the first key parameter carries the unencrypted first AV, the authorization device directly obtains the first AV from the first key parameter. When the first key parameter carries the encrypted first AV, the second authentication request further carries the random number NO used for encrypting the first AV. After obtaining NO from the second authentication request, the authorization device generates the symmetric crypto key based on the first symmetric key, NO, and the key derivation algorithm, and the authorization device decrypts the first key parameter by using the symmetric crypto key, to obtain the first AV. A decryption function used by the authorization device to decrypt the first key parameter corresponds to an encryption function used by the terminal device to encrypt the first AV.

Optionally, it can be learned from the foregoing description that, to prevent a replay attack, the first authentication request and the second authentication request further carry the first anti-replay attack parameter. For example, the first AV further includes the first anti-replay attack parameter. In this case, after receiving the second authentication request, the authorization device needs to obtain the first AV from the second authentication request, obtain the first anti-replay attack parameter from the first AV, and verify, based on the first anti-replay attack parameter, whether the second authentication request is a replay attack, and after determining that the second authentication request is not a replay attack and the authorization device successfully verifies the first ID, the first identity information, and the first authentication code, determine to authorize the ownership relationship between the terminal device and the network to which the registration device belongs.

Example 3: It is assumed that both the first authentication request VReq1 and the second authentication request VReq2 carry $ID_{old}$, $EAV_1$, CertR, the URL of the authorization device (optional), and AuthC. Based on the foregoing Example 1 and Example 2, a process in which the authorization device verifies the second authentication request VReq2 includes the following steps:

1: Obtain $ID_{old}$ from VReq2, and obtain $SK_{old}$ from the key database based on $ID_{old}$, and if $SK_{old}$ does not exist in the key database, return an error. If $SK_{old}$ exists in the key database, proceed to a next step.

2: Obtain the first identity information from VReq2, and search the ownership relationship record for $ID_{old}$ and the first identity information corresponding to $ID_{old}$. If the ownership relationship record includes $ID_{old}$, and the corresponding first identity information is consistent with the first identity information obtained from VReq2, verification succeeds.

3: Obtain NO and $EAV_1$ from VReq2, decrypt $EAV_1$ based on NO and $SK_{old}$ to obtain $AV_1$, obtain N1, N2, and CT from $AV_1$, and verify, based on CT, whether VReq2 is a replay attack. If VReq2 is a replay attack, return an error. If VReq2 is not a replay attack, proceed to a next step.

4: Obtain AuthC from VReq2, calculate the symmetric verification key $Key_I'$=HKDF($SK_{old}$, N1), calculate the first check code AuthC'=HMAC ($Key_I'$, ($ID_{old}$, CertR, N1, N2)), and verify whether AuthC' is the same as AuthC. If AuthC' is the same as AuthC, determine that the first authentication code is successfully verified, and determine to authorize the ownership relationship between the terminal device and the network to which the registration device belongs, or if AuthC' is different from AuthC, determine that the verification fails, and return an error.

After the authorization device decides to authorize the ownership relationship between the terminal device and the network to which the registration device belongs, the authorization device generates the first authentication acknowledgement message, and sends the first authentication acknowledgement message to the registration device. The first authentication acknowledgement message carries a second authentication code, and the second authentication code is generated based on the first symmetric key.

An implementation in which the authorization device generates the first authentication acknowledgement message is described below.

In some embodiments of this application, the first authentication acknowledgement message carries a second key parameter and the second authentication code. The authorization device determines a second AV, the authorization device generates the second key parameter based on the second AV, the second key parameter carries the second AV or an encrypted second AV, and the second AV is encrypted by using the key shared between the authorization device and the terminal device, for example, the first symmetric key. Then, the authorization device determines the input key of the second secure hash algorithm based on the first symmetric key, determines the input data of the second secure hash algorithm based on the first ID and the second AV, and processes the determined input data based on the second secure hash algorithm by using the determined input key, to obtain the second authentication code. The second AV includes a second anti-replay attack parameter, or the second AV includes the first random parameter and the second anti-replay attack parameter, or the second AV includes a second random parameter and the second anti-replay attack parameter, or the second AV includes the first random parameter, the second random parameter, and the second anti-replay attack parameter. The second random parameter is generated by the authorization device, and the second random parameter includes at least one random number.

An implementation in which the authorization device generates the second anti-replay attack parameter is as follows: the authorization device generates the second anti-replay attack parameter based on the first anti-replay attack parameter. It should be noted that, when the first anti-replay attack parameter is the first random number, the second anti-replay attack parameter is the second random number, and the first random number is different from the second random number. When the first anti-replay attack parameter is the first timestamp, the second anti-replay attack parameter is a second timestamp, and the second timestamp is a moment at which the authorization device generates the second anti-replay attack parameter. When the first anti-replay attack parameter is the first count value, the second anti-replay attack parameter is a second count value, and the second count value is obtained by adding 1 to the first count value. When the first anti-replay attack parameter is the first random number attached with the first timestamp, the second anti-replay attack parameter is the second random number attached with the second timestamp.

A first implementation in which the authorization device determines the second AV is as follows: The authorization device uses the second anti-replay attack parameter as the second AV. A second implementation in which the authorization device determines the second AV is as follows: The authorization device obtains the first random parameter (for example, N1 and N2) from the first AV, and the authorization device uses the first random parameter and the second anti-replay attack parameter as the second AV. A third implementation in which the authorization device determines the second AV is as follows: The authorization device generates the second random parameter, where the second random parameter includes at least one random number (for example, a random number N3), and the authorization device uses the second random parameter and the second anti-replay attack parameter as the second AV. A fourth implementation in which the authorization device determines the second AV is as follows: The authorization device obtains the first random parameter from the first AV, the authorization device generates the second random parameter, where the second random parameter includes at least one random number (for example, a random number N3), and the authorization device uses the first random parameter, the second random parameter, and the second anti-replay attack parameter as the second AV.

Optionally, the authorization device uses the first symmetric key as the input key of the second secure hash algorithm. Alternatively, the authorization device generates a derived key based on the first symmetric key and the key derivation algorithm, and uses the derived key as the input key of the second secure hash algorithm. The authorization device uses the first ID and the second AV as the input data of the second secure hash algorithm, or uses the first ID, the second AV, and the first identity information as the input data of the second secure hash algorithm. It should be noted that, the key derivation algorithm used by the authorization device to generate the second authentication code is the same as or different from the key derivation algorithm used by the terminal device to generate the first authentication code, and the second secure hash algorithm is the same as or different from the first secure hash algorithm.

Optionally, the first authentication acknowledgement message further carries the first ID, and the first authentication acknowledgement message indicates to the registration device to send a response of the authorization device to the terminal device corresponding to the first ID.

It can be learned from the foregoing description that, the first symmetric key in some embodiments of this application is used as an old device key, the old device key is shared only between the terminal device and the authorization device, and the first symmetric key is used by the terminal device and the authorization device to implement the foregoing identity authentication process. When the terminal device subsequently accesses the network to which the registration device belongs, network access identity authentication is still required. Therefore, the registration device and the terminal device need to negotiate a second symmetric key based on the response of the authorization device, the second symmetric key is shared only between the terminal device and the registration device, and the second symmetric key is used for network access identity authentication when the terminal device accesses the network to which the registration device belongs.

In some embodiments of this application, the first authentication acknowledgement message further carries key update information, the key update information is generated by the authorization device, and the key update information is encrypted and protected by using the symmetric key shared by the registration device and the authorization device, or the key update information is encrypted and protected by using a public key of the registration device. The key update information is used by the registration device to obtain a channel security key required for establishing a first secure transport channel with the terminal device, and to negotiate the second symmetric key with the terminal device by using the first secure transport channel. The second key parameter carried in the first authentication acknowledgement message is further used by the terminal device to determine a first derived parameter required for generating the channel security key, and to determine a second derived parameter required for negotiating the second symmetric key with the registration device by using the first secure transport channel.

The following describes an implementation in which the authorization device generates the key update information.

In some embodiments of this application, after determining the second AV, the authorization device generates the key update information based on the first symmetric key and the second AV. In an implementation, the authorization device determines the first derived parameter and the second derived parameter based on the second AV, generates a first negotiation key based on the first derived parameter, the first symmetric key, and the key derivation algorithm, and generates a second negotiation key based on the second derived parameter, the first symmetric key, and the key derivation algorithm, and the authorization device determines the key update information based on the first negotiation key and the second negotiation key.

For example, assuming that the second AV includes the second anti-replay attack parameter, or the second AV includes the first random parameter and the second anti-replay attack parameter, and the first random parameter includes N1 and N2, the authorization device uses N1 as the first derived parameter, and uses N2 as the second derived parameter. Assuming that the second AV includes the second random parameter and the second anti-replay attack parameter, or the second AV includes the first random parameter, the second random parameter, and the second anti-replay attack parameter, the first random parameter includes N1 and N2, and the second random parameter includes N3, the authorization device uses N1 and N3 as the first derived parameter, and uses N2 and N3 as the second derived parameter. Optionally, the authorization device may also generate more random numbers, to determine the first derived parameter and the second derived parameter. This is not limited in some embodiments of this application. For example, when the first random parameter includes N1, the authorization device generates random numbers N3 and N6, and the authorization device uses N1 and N3 as the first derived parameter, and uses N1 and N6 as the second derived parameter. Alternatively, the authorization device generates random numbers N3 and N6, uses N3 as the first derived parameter, and uses N6 as the second derived parameter.

The authorization device generates the first negotiation key based on the first derived parameter and the key derivation algorithm, and generates the second negotiation key based on the second derived parameter and the key derivation algorithm. For example, assuming that the first derived parameter includes N1 and N3, and the second derived parameter includes N2 and N3, the first negotiation key $K_{R1}$=HKDF(SK$_{old}$, N1, N3), and the second negotiation key $K_{R2}$=HKDF(SK$_{old}$, N2, N3).

It should be noted that, the first negotiation key corresponds to the first derived parameter, and the second negotiation key corresponds to the second derived parameter. The key update information includes the first negotiation key and the second negotiation key. The first negotiation key and the second negotiation key are information provided by the authorization device for the registration device, that is, information that can be obtained by the registration device. One of the first negotiation key and the second negotiation key is used as the channel security key subsequently determined by the registration device, and the other is used as a basis for the registration device to generate the second symmetric key. The second AV or the encrypted second AV included in the second key parameter is information provided by the authorization device for the terminal device. To be specific, the terminal device can obtain the second AV, and determine the first derived parameter and the second derived parameter based on the second AV. One of the first derived parameter and the second derived parameter is used as a basis for the terminal device to generate the channel security key, and the other is used as a basis for the terminal device to generate the second symmetric key. The channel security keys determined by the registration device and the terminal device are the same, and the generated second symmetric keys are also the same.

In some embodiments of this application, an example in which the first negotiation key is used as the channel security key obtained by the registration device, the second negotiation key is used as the basis for the registration device to generate the second symmetric key, the first derived parameter is used by the terminal device to generate the channel security key, and the second derived parameter is used by the terminal device to generate the second symmetric key is used. Details are described in step 405 below.

Optionally, to ensure security of communication between the registration device and the authorization device, the authorization device and the registration device communicate with each other by establishing a secure transport channel based on the digital certificate of the registration device. To be specific, the authorization device sends the first authentication acknowledgement message to the registration device via the secure transport channel. Alternatively, the authorization device encrypts the key update information by using the public key obtained from the digital certificate of the registration device, or encrypts the key update information by using the symmetric key shared between the authorization device and the registration device, and adds the encrypted key update information to the first authentication acknowledgement message. The authorization device sends, to the registration device, the first authentication acknowledgement message carrying the encrypted key update information.

Alternatively, the authorization device encrypts the first authentication acknowledgement message by using the public key of the registration device, or encrypts the first authentication acknowledgement message by using the symmetric key shared between the authorization device and the registration device, and sends the encrypted first authentication acknowledgement message to the registration device.

Optionally, regardless of whether a secure transport channel is established between the registration device and the authorization device for communication, the authorization device may ensure communication security by encrypting the key update information or encrypting the first authentication acknowledgement message. In other words, the key update information is obtained by encryption using the public key of the registration device, or is obtained by encryption using the symmetric key between the authorization device and the registration device.

Example 4: Based on the foregoing Example 3, a process in which the authorization device generates the first authentication acknowledgement message (voucher response, VResp1) includes:

1: Generate the random number N3=Rand( )
2: Generate the second authentication vector $AV_2=\{N1, N2, N3, CT+\}$.
3: Generate the second authentication code AuthS=HMAC ($Key_I'$, ($ID_{old}$, CertR, N1, N2, N3)).
4: Calculate the first negotiation key $K_{R1}$=HKDF($SK_{old}$, N1, N3) and the second negotiation key $K_{R2}$=HKDF ($SK_{old}$, N2, N3).
5: Encrypt $K_{R1}$ and $K_{R2}$ by using the first public key $PK_R$ provided in the digital certificate of the registration device, to obtain the key update information EKV=E ($PK_R$, $K_{R1}$, $K_{R2}$). E( ) may be implemented by using RAS, SM3, or another elliptic curve based public key algorithm.
6: Obtain the first authentication acknowledgement message VResp1 that carries $ID_{old}$, $AV_2$, AuthS, and EKV.

It can be learned from the foregoing description that, the first authentication acknowledgement message carries the first ID (optional), the second key parameter, the second authentication code, and the key update information (optional). The key update information includes the first negotiation key and the second negotiation key, and the key update information is plaintext or ciphertext.

Step 404: The registration device receives the first authentication acknowledgement message, determines a second authentication acknowledgement message based on the first authentication acknowledgement message, and sends the second authentication acknowledgement message to the terminal device, where the second authentication acknowledgement message carries the second authentication code.

In some embodiments of this application, after receiving the first authentication acknowledgement message, the registration device determines identity validity of the terminal device. That is, the registration device determines that identity authentication of the terminal device succeeds. Then, the registration device determines the second authentication acknowledgement message based on the first authentication acknowledgement message, and sends the second authentication acknowledgement message to the terminal device, where the second authentication acknowledgement message carries the second authentication code. For example, the registration device forwards the first authentication acknowledgement message as the second authentication acknowledgement message to the terminal device.

It can be learned from the foregoing description that, to subsequently establish the first secure transport channel between the registration device and the terminal device for negotiating the second symmetric key, the first authentication acknowledgement message further carries the key update information. The key update information includes the first negotiation key and the second negotiation key, and the key update information is plaintext or ciphertext.

When the key update information is plaintext, after receiving the first authentication acknowledgement message, the registration device obtains the key update information from the first authentication acknowledgement message, and stores the first negotiation key and the second negotiation key for subsequent establishment of the secure transport channel and negotiation of the second symmetric key with the terminal device. Afterward, the registration device deletes the key update information from the first authentication acknowledgement message to obtain the second authentication acknowledgement message.

When the key update information is ciphertext, after receiving the first authentication acknowledgement message, the registration device obtains the key update information from the first authentication acknowledgement message, and decrypts the key update information by using a private key corresponding to the public key of the registration device, or decrypts the key update information by using the symmetric key shared between the registration device and the authorization device, to obtain the first negotiation key and the second negotiation key. Then, the registration device forwards the first authentication acknowledgement message as the second authentication acknowledgement message to the terminal device.

Optionally, when the key update information is encrypted or not encrypted, the registration device may delete the key update information from the first authentication acknowledgement message to obtain the second authentication acknowledgement message.

Optionally, when the first authentication acknowledgement message is encrypted by using the public key of the registration device, or is encrypted by using the symmetric key shared between the registration device and the authorization device, after receiving the first authentication acknowledgement message, the registration device decrypts the first authentication acknowledgement message by using the private key corresponding to the public key or the symmetric key, obtains key update information from the decrypted first authentication acknowledgement message, and stores the first negotiation key and the second negotiation key.

Example 5: Based on the foregoing Example 4, a process in which the registration device determines the second authentication acknowledgement message VResp2 based on the first authentication acknowledgement message VResp1 includes:

1: Obtain EKV from VResp1, decrypt EKV by using the private key corresponding to the public key $PK_R$, to obtain $K_{R1}$ and $K_{R2}$, and store $K_{R1}$ and $K_{R2}$.

2: Send VResp1 to the terminal device as VResp2. It should be noted that, if $K_{R1}$ and $K_{R2}$ in VResp1 are not encrypted, the registration device needs to delete $K_{R1}$ and $K_{R2}$ from VResp1 to obtain VResp2.

It can be learned from the foregoing description that, the second authentication acknowledgement message carries the first ID (optional), the second key parameter, the second authentication code, and the key update information (optional). The key update information is chosen to be carried when encrypted, and is not carried when not encrypted.

Step 405: The terminal device receives the second authentication acknowledgement message, verifies the second authentication code based on the first symmetric key, and determines, after verification succeeds, that bidirectional identity authentication of the terminal device and the registration device succeeds.

In some embodiments of this application, after receiving the second authentication acknowledgement message, the terminal device verifies the second authentication code based on the first symmetric key, and determines, after verification succeeds, that bidirectional identity authentication of the terminal device and the registration device succeeds. It should be noted that, the algorithm used by the terminal device to verify the second authentication code needs to be the same as the algorithm used by the authorization device to generate the second authentication code, to ensure verification accuracy.

It can be learned from the foregoing description that, the second authentication acknowledgment message carries the second key parameter and the second authentication code. Based on this, the terminal device verifies the second authentication code based on the first symmetric key and the second key parameter. Optionally, the terminal device generates a symmetric verification key based on the first symmetric key and the second key parameter, and the terminal device verifies the second authentication code based on the symmetric verification key In some embodiments of this application, the second authentication code is obtained as follows: The authorization device determines the input key of the second secure hash algorithm based on the first symmetric key, determines the input data of the second secure hash algorithm based on the first ID and the second AV, and then processes the determined input data based on the second secure hash algorithm by using the determined input key. In this case, an implementation in which the terminal device verifies the second authentication code is as follows: The terminal device obtains the second key parameter from the second authentication acknowledgement message, obtains the second AV from the second key parameter, determines the input key (the symmetric verification key) of the second secure hash algorithm based on the first symmetric key, and after determining the input data of the second secure hash algorithm based on the first ID and the second AV, processes the determined input data based on the second secure hash algorithm by using the determined input key. If the second key parameter includes the ciphertext of the second AV, the terminal device decrypts the second key parameter by using the symmetric key shared by the terminal device and the authorization device, to obtain the second AV. For example, if the authorization device encrypts the second key parameter by using the first symmetric key, the terminal device decrypts the second key parameter by using the first symmetric key.

It should be noted that, if the authorization device uses the second symmetric key as the input key of the second secure hash algorithm, the terminal device also uses the second symmetric key as the input key of the second secure hash algorithm when verifying the second authentication code. After generating the derived key based on the first symmetric key and the key derivation algorithm, if the authorization device uses the derived key as the input key of the second secure hash algorithm, after generating a derived key based on the first symmetric key and the key derivation algorithm when verifying the second authentication code, the terminal device also uses the derived key as the input key of the second secure hash algorithm. In other words, the manner in which the terminal device verifies the second authentication code needs to be consistent with the manner in which the authorization device generates the second authentication code, to ensure verification accuracy.

It can be learned from the foregoing description that, to prevent a replay attack, the second authentication acknowledgement message further carries the second anti-replay attack parameter. The second AV includes the second anti-replay attack parameter. Based on this, after receiving the second authentication acknowledgement message, the terminal device first extracts the second anti-replay attack parameter from the second authentication acknowledgement message, that is, obtains the second anti-replay attack parameter from the second AV. The terminal device verifies, based on the second anti-replay attack parameter, whether the second authentication acknowledgement message is a replay attack. After determining that the second authentication acknowledgement message is not a replay attack and successfully verifying the second authentication code, the terminal device determines that bidirectional identity authentication succeeds, that is, it indicates that the registration device is authorized by the authorization device as a new network owner of the terminal device.

Example 6: Based on the foregoing Example 5, a process in which the terminal device verifies the second authentication acknowledgement message VResp2 includes:

1: Obtain N3 and CT+ from VResp2.

2: Check, based on CT+, whether VResp2 is a replay attack. If VReq2 is a replay attack, return an error. If VReq2 is not a replay attack, proceed to a next step.

3: Obtain AuthS from VResp2. Calculate AuthS'=HMAC ($Key_I$, ($ID_{old}$, CertR, N1, N2, N3)). Verify whether AuthS' is the same as AuthS. If AuthS' is the same as AuthS, determine that bidirectional identity authentication succeeds. If AuthS' is different from AuthS, determine that bidirectional identity authentication fails, and return an error.

The foregoing process in which the terminal device, the registration device, and the authorization device cooperate to implement bidirectional identity authentication between the terminal device and the registration device may be considered as the mutual trust based authorization phase after the network access discovery phase.

Optionally, it can be learned from the foregoing description that, to subsequently establish the first secure transport channel between the terminal device and the registration device for negotiating the second symmetric key, the first authentication acknowledgement message and the second authentication acknowledgement message further carry the key update information, the key update information is used by the registration device to obtain the channel security key required for establishing the first secure transport channel with the terminal device, and to negotiate the second symmetric key with the terminal device by using the first secure transport channel. The second key parameter is further used by the terminal device to determine a first derived parameter required for generating the channel security key, and to determine a second derived parameter required for negotiating the second symmetric key with the registration device by using the first secure transport channel.

The key update information carries plaintext or ciphertext of the first negotiation key and the second negotiation key, the first negotiation key is generated by the authorization device based on the first symmetric key, the first derived parameter, and the key derivation algorithm, and the second negotiation key is generated by the authorization device based on the first symmetric key, the second derived parameter, and the key derivation algorithm. The registration device can obtain the first negotiation key and the second negotiation key from the key update information, and the registration device uses the first negotiation key as the channel security key, and generates the second symmetric key based on the second negotiation key. Alternatively, the registration device uses the second negotiation key as the channel security key, and generates the second symmetric key based on the first negotiation key.

In some embodiments of this application, after determining that bidirectional identity authentication succeeds, the terminal device determines the first derived parameter based on the second key parameter, and generates the channel security key based on the first symmetric key and the first derived parameter. The first secure transport channel is established between the terminal device and the registration device based on the channel security key. The terminal device determines the second derived parameter based on the second key parameter, and negotiates the second symmetric key with the registration device based on the second derived parameter by using the first secure transport channel.

In some embodiments of this application, the terminal device can obtain the second key parameter from the second authentication acknowledgement message, obtain the second AV from the second key parameter, and determine the first derived parameter and the second derived parameter based on the second AV. The terminal device generates the first negotiation key based on the first symmetric key and the first derived parameter, and generates the second negotiation key based on the first symmetric key and the second derived parameter. For an implementation in which the terminal device determines the first derived parameter and the second derived parameter based on the second AV, refer to the foregoing related description of determining, by the authorization device, the first derived parameter and the second derived parameter based on the second AV. Details are not described herein again.

In some embodiments of this application, the channel security key is the same as the first negotiation key, and the terminal device negotiates the second symmetric key with the registration device based on the second derived parameter by using the first secure transport channel. Alternatively, the channel security key is the same as the second negotiation key, and the terminal device negotiates the second symmetric key with the registration device based on the first derived parameter by using the first secure transport channel.

In other words, assuming that the registration device uses the obtained first negotiation key as the channel security key, and generates the second symmetric key based on the second negotiation key, the terminal device uses the first negotiation key generated based on the first derived parameter as the channel security key, and generates the second symmetric key based on the second negotiation key generated based on the second derived parameter. Assuming that the registration device uses the obtained second negotiation key as the channel security key, and generates the second symmetric key based on the first negotiation key, the terminal device uses the second negotiation key generated based on second derived parameter as the channel security key, and generates the second symmetric key based on the first negotiation key generated based on the first derived parameter. In other words, it is ensured that the channel security keys determined by the registration device and the terminal device are the same, and the second symmetric keys respectively generated by the registration device and the terminal device are also the same.

The following describes a process of negotiating the second symmetric key between the terminal device and the registration device via the first secure transport channel by using an example in which the channel security key is the same as the first negotiation key, and the terminal device negotiates the second symmetric key with the registration device based on the second derived parameter via the first secure transport channel.

A first implementation in which the terminal device negotiates the second symmetric key with the registration device by using the first secure transport channel is as follows:

The terminal device generates a random number N4, and sends N4 to the registration device by using the first secure transport channel, where N4 indicates to the registration device to generate the second symmetric key based on N4 and the second negotiation key, and to generate third authentication code based on N4 and the second symmetric key. The terminal device determines the second derived parameter based on the second key parameter, and generates the second symmetric key based on N4 and the second derived parameter. The terminal device receives a first negotiation acknowledgement message sent by the registration device, where the first negotiation acknowledgement message carries the third authentication code, the terminal device verifies the third authentication code based on the second symmetric key and N4 that are generated by the terminal device, and after verification succeeds, updates the second symmetric key to a device key between the terminal device and the registration device, and sends a second negotiation acknowledgement message to the registration device, where the second negotiation acknowledgement message indicates to the registration device to update the second symmetric key to the device key between the registration device and the terminal device.

Optionally, the terminal device generates the second symmetric key based on N4, the second negotiation key, and the key derivation algorithm, and the registration device generates the second symmetric key based on N4, the second negotiation key, and the same key derivation algorithm. The registration device generates the third authentication code based on a third secure hash algorithm, and the terminal device verifies the third authentication code based on the third secure hash algorithm. The third secure hash algorithm is the same as or different from the first secure hash algorithm, and the third secure hash algorithm is the same as or different from the second secure hash algorithm.

Optionally, the registration device uses the second symmetric key as an input key of the third secure hash algorithm, or the registration device generates a derived key based on the second symmetric key and the key derivation algorithm, and uses the derived key as the input key of the third secure hash algorithm. The registration device uses N4 as input data of the third secure hash algorithm, and the registration device processes the determined input data based on the third secure hash algorithm by using the determined input key, to obtain the third authentication code. A manner in which the terminal device verifies the third authentication code based on the second symmetric key and N4 that are generated by the terminal device is consistent with a manner in which the registration device generates the third authentication code, to ensure verification accuracy.

For example, it is assumed that the first negotiation key is $K_{R1}$, the second negotiation key is $K_{R2}$, the second symmetric key is $SK_{new}$, a TLS channel is established between the terminal device and the registration device based on $K_{R1}$, the terminal device generates N4, and sends N4 to the registration device by using the TLS channel, and the terminal device calculates $SK_{new}=KDF(K_{R2}, N4)$. After receiving N4, the registration device calculates $SK_{new}=KDF_1(K_{R2}, N4)$, a derived key $AK-KDF_2(SK_{new})$, and a response $ACK=HMAC_{AK}(N4)$. The registration device sends the response (that is, the first negotiation acknowledgement message) to the terminal device. After receiving the response, the terminal device verifies ACK. A verification process is: calculating $AK'=KDF_2(SK_{new'})$, $ACK'=HMAC_{AK'}(N4)$, and determines whether ACK' is equal to ACK. In other words, it is determined whether ACK' obtained by the terminal device through calculation is the same as ACK sent by the registration device in response. If ACK' obtained by the terminal device through calculation is the same as ACK sent by the registration device in response, the terminal device determines that verification on the third authentication code succeeds. After the verification on the third authentication code succeeds, the terminal device determines to determine the second symmetric key through negotiation with the registration device, and returns the second negotiation acknowledgement message to the registration device. After receiving the second negotiation acknowledgement message, the registration device determines to determine the second symmetric key through negotiation with the terminal device.

It can be learned from the foregoing description that, in the first implementation of negotiating the second symmetric key, the terminal device generates the random number N4 used to negotiate the second symmetric key, and synchronizes N4 with the registration device. Both the registration device and the terminal device use N4 as a basis for generating the second symmetric key, and generate the second symmetric key in a same manner.

A second implementation in which the terminal device negotiates the second symmetric key with the registration device by using the first secure transport channel is described next.

The terminal device receives a random number N5 sent by the registration device by using the first secure transport channel, where N5 is randomly generated by the registration device, and N5 and the second negotiation key are used by the registration device to generate the second symmetric key. The terminal device generates the second symmetric key based on N5 and the second derived parameter, and updates the second symmetric key to the device key between the terminal device and the registration device. The terminal device generates the second negotiation key based on the second derived parameter, and generates the second symmetric key based on N5 and the second negotiation key.

In the second implementation of negotiating the second symmetric key, the registration device generates the random number N5 used to negotiate the second symmetric key, and synchronizes N5 to the terminal device. Both the registration device and the terminal device use N5 as a basis for generating the second symmetric key, and generate the second symmetric key in a same manner.

It should be noted that, after the terminal device and the registration device negotiate the second symmetric key, both the terminal device and the registration device store the second symmetric key, for subsequent network access identity authentication.

Optionally, after the terminal device and the registration device negotiate the second symmetric key by using the first secure transport channel, the registration device sends at least one of the second ID or the configuration information to the terminal device by using the first secure transport channel. The second ID is an ID allocated by the registration device to the terminal device, that is, the registration device delivers a new identity to the terminal device. The second ID and the second symmetric key are used for network access identity authentication when the terminal device accesses the network to which the registration device belongs. After receiving the second ID and the configuration information that are sent by the registration device, the terminal device stores the second ID and the configuration information.

Optionally, it can be learned from the foregoing description that, the system architecture further includes a controller. After negotiating and confirming the second symmetric key, the registration device sends, to the controller, a configuration request that carries the first ID and the second symmetric key. After receiving the configuration request, the controller sends at least one of the second ID or the configuration information to the registration device, and the registration device forwards the second ID and the configuration information to the terminal device by using the first secure transport channel, or the controller directly sends the second ID and the configuration information to the terminal device. Optionally, the controller is further configured to: store, manage, and maintain a mapping relationship between an ID of the terminal device and a corresponding device key, for example, correspondingly store the first ID, the second ID, and the second symmetric key.

Figure 5:
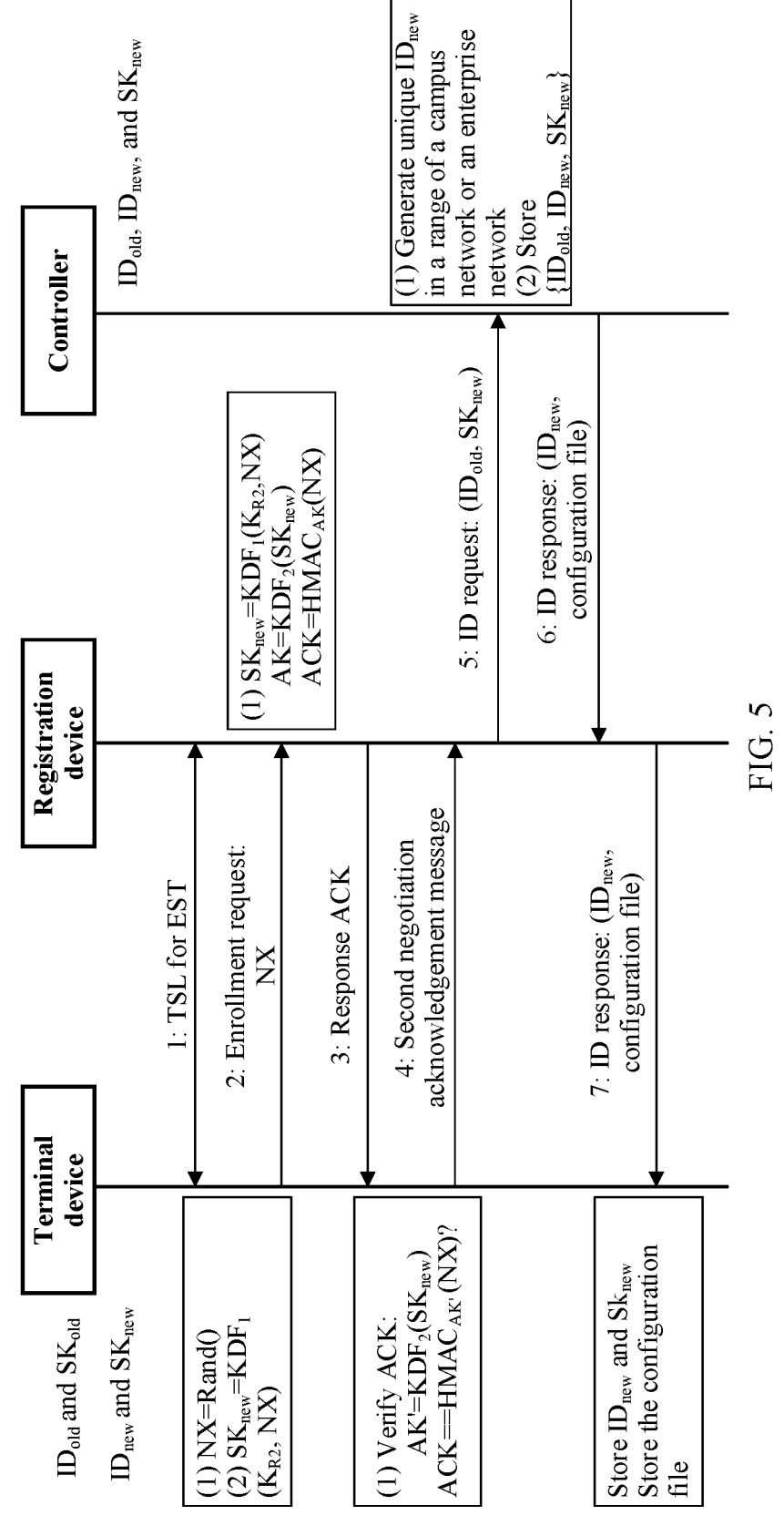
FIG. 5 is a flowchart of an enrollment over security transport (EST) phase according to an embodiment of this application.

The foregoing process in which the terminal device establishes the first secure transport channel with the registration device to negotiate the second symmetric key may be considered as an EST phase. The following describes the process again with reference to FIG. 5. In FIG. 5, the process includes the following steps:

1: Establish the first secure transport channel between the terminal device and the registration device based on the first negotiation key $K_{R1}$ to perform secure communication (TLS for EST).

2: The terminal device generates a random number $NX=Rand( )$, calculates $SK_{new}=KDF_1(K_{R2}, NX)$, and sends, to the registration device, an enrollment (enrollment, Enrol) request carrying NX.

3: The registration device calculates $SK_{new}=KDF_1(K_{R2}, NX)$, calculates $AK=KDF_2(SK_{new})$, and $ACK=HMAC_{AK}(NX)$, and sends the response ACK (the first negotiation acknowledgement message) to the terminal device.

4: The terminal device verifies ACK: calculates $AK'=KDF_2(SK_{new})$, and determines whether ACK is equal to $HMAC_{AK}(NX)$. After determining that ACK is equal to $HMAC_{AK}(NX)$, the terminal device sends the second negotiation acknowledgement message to the registration device.

5: The registration device stores $SK_{new}$ and sends, to the controller, a configuration request message (ID request) carrying $ID_{old}$ and $SK_{new}$.

6: The controller generates new unique $ID_{new}$ within a range of a campus network or an enterprise network, and sends, to the registration device, a response message (ID response) carrying $ID_{new}$ and a configuration file (configuration information). The controller correspondingly stores ($ID_{old}$, $ID_{new}$, $SK_{new}$).

7: The registration device forwards the ID response to the terminal device.

8: The terminal device stores $ID_{new}$ and $SK_{new}$, and stores the configuration file.

In some embodiments of this application, the terminal device, the registration device, and the authorization device implement identity authentication by using the method described above. The following describes the foregoing process again with reference to FIG. 6.

Figure 6:
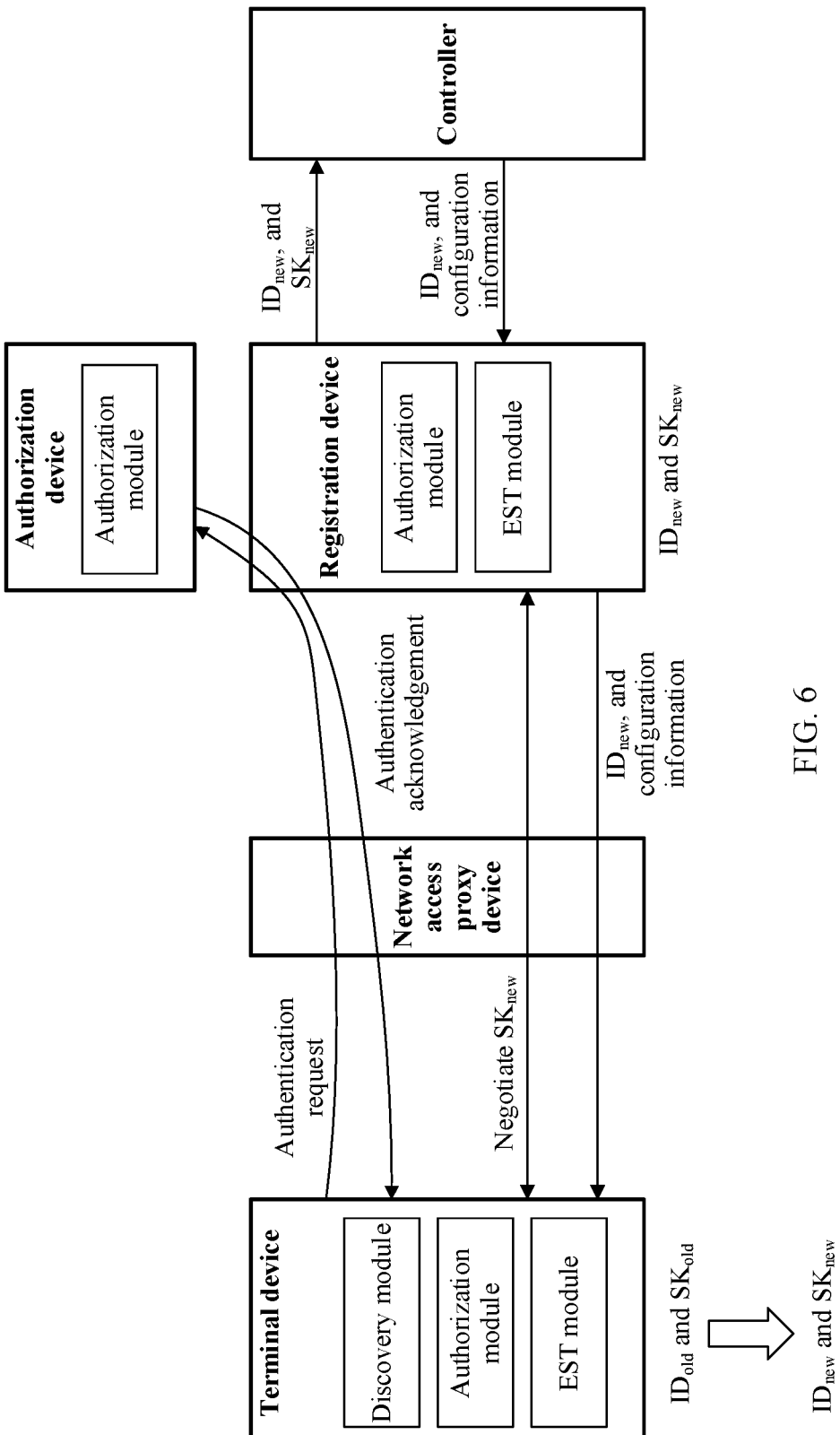
FIG. 6 is a flowchart of another identity authentication method according to an embodiment of this application.

With reference to FIG. 6, the terminal device includes a discovery module, an authorization module, and an EST module, the registration device includes an authorization module and an EST module, and the authorization device includes an authorization module.

The discovery module included in the terminal device has a corresponding function implemented by the terminal device in the foregoing network access discovery phase. For example, the discovery module finds the network access proxy device through searching, and communicates with the registration device by using the network access proxy device.

The authorization module included in the terminal device has a corresponding function implemented by the terminal device in the foregoing mutual trust based authorization phase. For example, the authorization module generates and sends the first authentication request, and receives and verifies the second authentication acknowledgement message. The authorization module included in the registration device has a corresponding function implemented by the registration device in the foregoing mutual trust based authorization phase. For example, the authorization module receives the first authentication request and the first authentication acknowledgement message, and generates and sends the second authentication request and the second authentication acknowledgement message. The authorization module included in the authorization device has a corresponding function implemented by the authorization device in the foregoing mutual trust based authorization phase. For example, the authorization module receives and verifies the second authentication request, and generates and sends the first authentication acknowledgement message.

The EST module included in the terminal device has a corresponding function implemented by the terminal device in the foregoing EST phase. For example, the EST module and the registration device establish the first secure transport channel, negotiate the second symmetric key, and receive the second ID and the configuration information. The EST module included in the registration device has a corresponding function implemented by the registration device in the foregoing EST phase. For example, the EST module and the terminal device establish the first secure transport channel, negotiate the second symmetric key, and deliver the second ID and the configuration information.

It can be learned from the foregoing description that, in some embodiments of this application, a symmetric key based remote zero touch network access method is implemented. A MAC address of the terminal device does not need to be manually recorded into a database of the registration device, and QR code on the terminal device does not need to be manually scanned to record the identity information of the terminal device. The terminal device only needs to support a lightweight symmetric cryptographic technology, so that labor costs are greatly reduced, and security is improved. The terminal device does not need to support an asymmetric cryptographic technology. This reduces costs of the terminal device, and has a great advantage for a terminal device with limited resources and relatively low costs. In addition, in some embodiments of this application, in the process in which the device key is updated from the first symmetric key to the second symmetric key, the terminal device or the registration device generates a random number. In this way, security of the key can be ensured based on underlying hardware security, and the device key can be updated without receiving an external (for example, the authorization device) input. This is more secure.

In conclusion, in some embodiments of this application, a symmetric key based identity verification method is implemented by sharing the first symmetric key between the terminal device and the authorization device. In this way, when confidentiality of the symmetric key is ensured, authentication code generated based on the symmetric key in an entire identity authentication process is not easily forged, so that security and reliability of identity authentication can be ensured. In addition, in this solution, bidirectional identity authentication of the terminal device and the registration device is implemented by using the authorization device, to avoid a security issue of unidirectional identity authentication. That is, security of this solution is higher.

Figure 7:
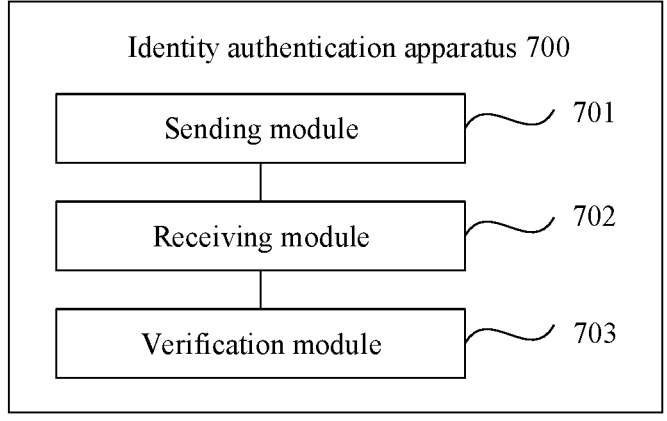
FIG. 7 is a schematic diagram of a structure of an identity authentication apparatus according to an embodiment of this application.

FIG. 7 is a schematic diagram of a structure of an identity authentication apparatus 700 according to an embodiment of this application. The identity authentication apparatus 700 may be implemented as a part or an entirety of a computer device by using software, hardware, or a combination of software and hardware. The computer device may be the computer device shown in FIG. 3, and the computer device is the terminal device in the foregoing embodiment. In some embodiments of this application, the apparatus 700 is used in a terminal device, the terminal device and an authorization device share a first symmetric key, the authorization device stores an ownership relationship record of the terminal device, and the ownership relationship record describes a binding relationship between the terminal device and a current owner of the terminal device. As shown in FIG. 7, the apparatus 700 includes a sending module 701, a receiving module 702, and a verification module 703.

The sending module 701 is configured to send a first authentication request, where the first authentication request carries a first authentication code, and the first authentication code is generated based on the first symmetric key.

The receiving module 702 is configured to receive a second authentication acknowledgement message, where the second authentication acknowledgement message is determined after verification on the first authentication code based on the first symmetric key and the ownership relationship record succeeds, the second authentication acknowledgement message carries a second authentication code, and the second authentication code is generated by the authorization device based on the first symmetric key.

The verification module 703 is configured to: verify the second authentication code based on the first symmetric key, and determine, after verification succeeds, that bidirectional identity authentication of the terminal device and a registration device succeeds.

Optionally, the first authentication request further carries a first ID and a first key parameter, the first key parameter includes plaintext or ciphertext of a first AV, and the first ID is an ID configured by an original owner of the terminal device for the terminal device.

The first AV includes a first random parameter and a first anti-replay attack parameter, the first random parameter is generated by the terminal device, and the first random parameter includes at least one of a first random number N1 or a second random number N2.

The first authentication code is generated based on the first symmetric key, the first ID, and the first AV.

Optionally, the first authentication request further carries first identity information, and the first identity information includes at least one of identity information of the registration device or identity information of a network to which the registration device belongs.

The first authentication code is generated based on the first symmetric key, the first ID, the first AV, and the first identity information.

Optionally, the second authentication acknowledgement message further carries a second key parameter.

The verification module 703 includes:

a first generation submodule, configured to generate a symmetric verification key based on the first symmetric key and the second key parameter; and a verification submodule, configured to verify the second authentication code based on the symmetric verification key.

Figure 8:
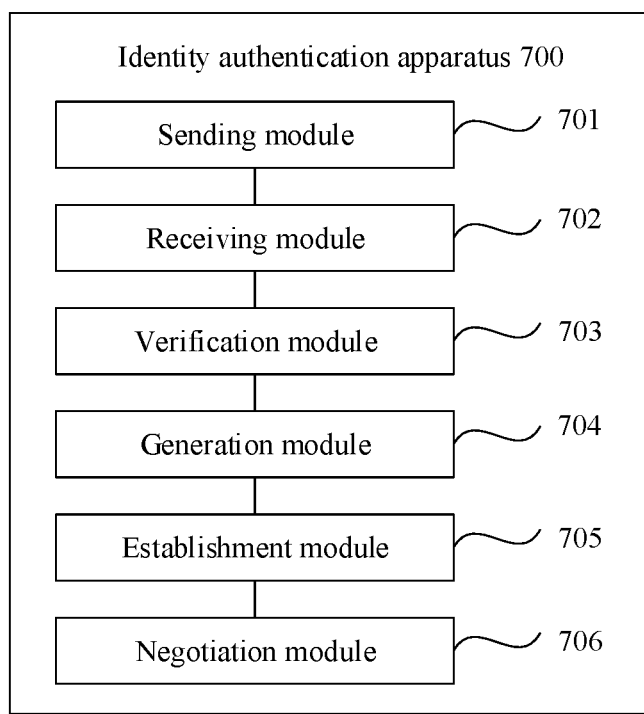
FIG. 8 is a schematic diagram of a structure of another identity authentication apparatus according to an embodiment of this application.

Optionally, as shown in FIG. 8, the apparatus 700 further includes:

a generation module 704, configured to generate a channel security key based on the first symmetric key and a first derived parameter, where the first derived parameter is determined based on the second key parameter;

an establishment module 705, configured to establish a first secure transport channel with the registration device based on the channel security key; and a negotiation module 706, configured to negotiate a second symmetric key with the registration device based on a second derived parameter by using the first secure transport channel, where the second symmetric key is used for network access identity authentication when the terminal device accesses the network to which the registration device belongs, and the second derived parameter is determined based on the second key parameter.

Optionally, the negotiation module 706 includes:

a second generation submodule, configured to: generate a random number N4, and send N4 to the registration device by using the first secure transport channel, where N4 is used for the registration device to generate the second symmetric key based on N4 and a second negotiation key, and to generate third authentication code based on N4 and the second symmetric key, where the second negotiation key is generated by the authorization device based on the second derived parameter and is sent to the registration device;

a third generation submodule, configured to generate the second symmetric key based on N4 and the second derived parameter;

a first receiving submodule, configured to receive a first negotiation acknowledgement message sent by the registration device, where the first negotiation acknowledgement message carries the third authentication code; and a first update submodule, configured to: verify the third authentication code based on the second symmetric key and N4 that are generated by the terminal device, and update, after verification succeeds, the second symmetric key to a device key between the terminal device and the registration device, and send a second negotiation acknowledgement message to the registration device, where the second negotiation acknowledgement message indicates to the registration device to update the second symmetric key to the device key between the registration device and the terminal device.

Optionally, the negotiation module 706 includes:

a second receiving submodule, configured to receive a random number N5 sent by the registration device by using the first secure transport channel, where N5 is randomly generated by the registration device, and N5 is used for the registration device to generate the second symmetric key based on N5 and the second negotiation key, and to update the second symmetric key to a device key between the registration device and the terminal device; and a second update submodule, configured to: generate the second symmetric key based on N5 and the second derived parameter, and update the second symmetric key to the device key between the terminal device and the registration device.

In embodiments of this application, a symmetric key based identity verification method is implemented by sharing the first symmetric key between the terminal device and the authorization device. In this way, when confidentiality of the symmetric key is ensured, authentication code generated based on the symmetric key in an entire identity authentication process is not easily forged, so that security and reliability of identity authentication can be ensured. In addition, in this solution, bidirectional identity authentication of the terminal device and the registration device is implemented by using the authorization device, to avoid a security issue of unidirectional identity authentication. That is, security of this solution is higher.

It should be noted that, when the identity authentication apparatus provided in the foregoing embodiment performs identity authentication, division of the foregoing functional modules is merely used as an example for description. In an actual application, the foregoing functions may be allocated to different functional modules for implementation as required, that is, an internal structure of the apparatus is divided into different functional modules, so as to implement all or some of the functions described above. In addition, the identity authentication apparatus provided in the foregoing embodiment and the identity authentication method embodiment pertain to a same concept. For a detailed implementation process of the apparatus, refer to the method embodiment. Details are not described herein again.

Figure 9:
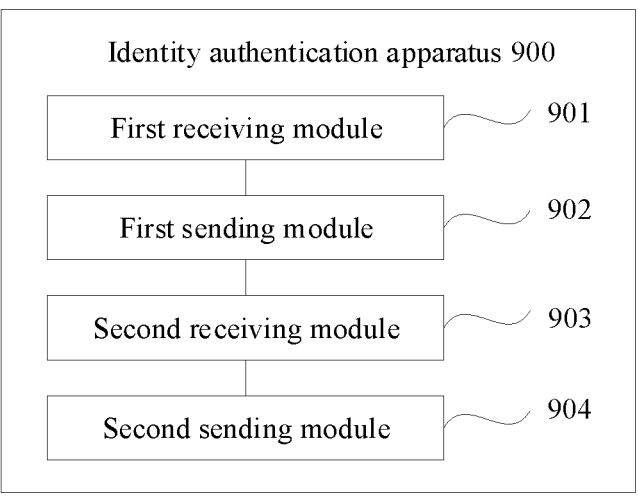
FIG. 9 is a schematic diagram of a structure of still another identity authentication apparatus according to an embodiment of this application.

FIG. 9 is a schematic diagram of a structure of an identity authentication apparatus 900 according to an embodiment of this application. The identity authentication apparatus 900 may be implemented as a part or an entirety of a computer device by using software, hardware, or a combination of software and hardware. The computer device may be the computer device shown in FIG. 3, and the computer device is the registration device in the foregoing embodiment. In some embodiments of this application, the apparatus 900 is applied to a registration device. With reference to FIG. 9, the apparatus 900 includes a first receiving module 901, a first sending module 902, a second receiving module 903, and a second sending module 904.

The first receiving module 901 is configured to receive a first authentication request, where the first authentication request carries a first authentication code, the first authentication code is generated by a terminal device based on a first symmetric key, and the terminal device and an authorization device share the first symmetric key.

The first sending module 902 is configured to: generate a second authentication request based on the first authentication request, and send the second authentication request to the authorization device, where the second authentication request carries the first authentication code.

The second receiving module 903 is configured to: receive a first authentication acknowledgement message, where the first authentication acknowledgement message is determined after verification performed by the authorization device on the first authentication code based on the first symmetric key and an ownership relationship record of the terminal device succeeds, the authorization device stores the ownership relationship record, the ownership relationship record describes a binding relationship between the terminal device and a current owner of the terminal device, the first authentication acknowledgement message indicates to authorize an ownership relationship between the terminal device and a network to which the registration device belongs, the first authentication acknowledgement message carries a second authentication code, and the second authentication code is generated based on the first symmetric key.

The second sending module 904 is configured to: determine a second authentication acknowledgement message based on the first authentication acknowledgement message, and send the second authentication acknowledgement message to the terminal device, where the second authentication acknowledgement message carries the second authentication code, and the second authentication acknowledgement message indicates to the terminal device to determine, after verification on the second authentication code based on the first symmetric key succeeds, that bidirectional identity authentication of the terminal device and the registration device succeeds.

Optionally, the first authentication request further carries a first ID, the first ID is an ID configured by an original owner of the terminal device for the terminal device, the second authentication request further carries the first ID in the first authentication request, the second authentication request further carries first identity information, and the first identity information includes at least one of identity information of the registration device or identity information of the network to which the registration device belongs.

Optionally, the second authentication request further carries an identity signature of the registration device, and the identity signature of the registration device is a signature conducted by the registration device on the first authentication request and the first identity information by using a private key.

Optionally, the identity information of the registration device includes at least one of a digital certificate related to an identity of the registration device or a digest of the digital certificate related to the identity of the registration device.

Optionally, the first authentication acknowledgement message further carries key update information, the key update information is encrypted and protected by using a symmetric key shared by the registration device and the authorization device, or the key update information is encrypted and protected by using a public key of the registration device.

Figure 10:
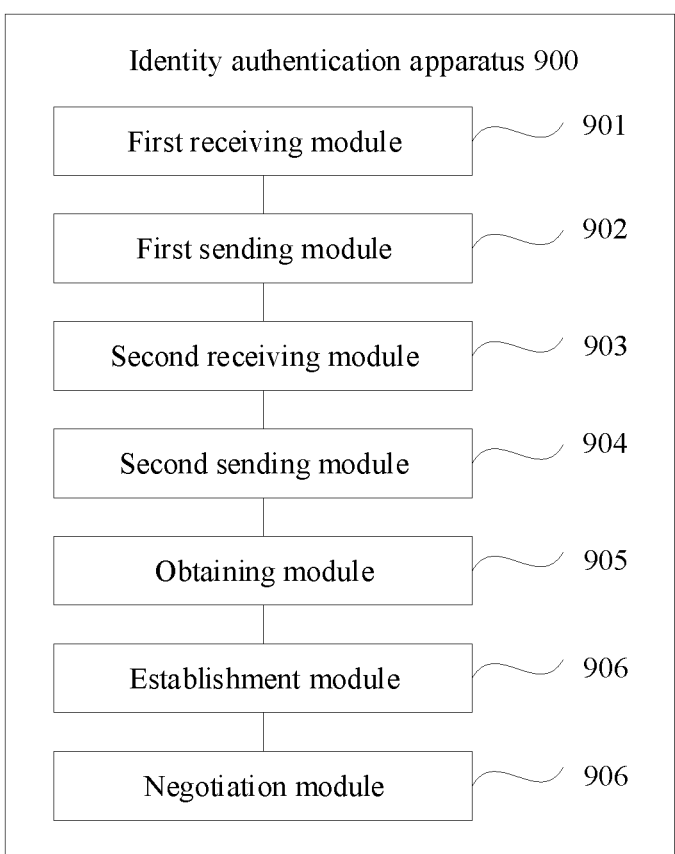
FIG. 10 is a schematic diagram of a structure of still another identity authentication apparatus according to an embodiment of this application.

With reference to FIG. 10, the apparatus 900 further includes:

an obtaining module 905, configured to obtain a channel security key from the key update information;

an establishment module 906, configured to establish a first secure transport channel with the terminal device based on the channel security key; and a negotiation module 907, configured to negotiate a second symmetric key with the terminal device based on the key update information by using the first secure transport channel, where the second symmetric key is used for network access identity authentication when the terminal device accesses the network to which the registration device belongs.

In some embodiments of this application, a symmetric key based identity verification method is implemented by sharing the first symmetric key between the terminal device and the authorization device. In this way, when confidentiality of the symmetric key is ensured, authentication code generated based on the symmetric key in an entire identity authentication process is not easily forged, so that security and reliability of identity authentication can be ensured. In addition, in this solution, bidirectional identity authentication of the terminal device and the registration device is implemented by using the authorization device, to avoid a security issue of unidirectional identity authentication. That is, security of this solution is higher.

It should be noted that, when the identity authentication apparatus provided in the foregoing embodiment performs identity authentication, division of the foregoing functional modules is merely used as an example for description. In an actual application, the foregoing functions may be allocated to different functional modules for implementation as required, that is, an internal structure of the apparatus is divided into different functional modules, so as to implement all or some of the functions described above. In addition, the identity authentication apparatus provided in the foregoing embodiment and the identity authentication method embodiment pertain to a same concept. For a detailed implementation process of the apparatus, refer to the method embodiment. Details are not described herein again.

Figure 11:
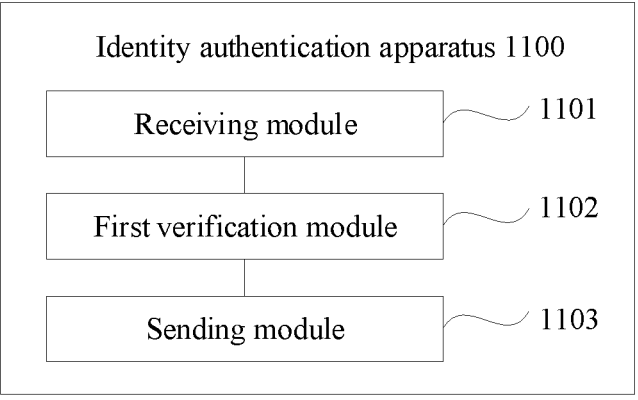
FIG. 11 is a schematic diagram of a structure of still another identity authentication apparatus according to an embodiment of this application.

FIG. 11 is a schematic diagram of a structure of an identity authentication apparatus 1100 according to an embodiment of this application. The identity authentication apparatus 1100 may be implemented as a part or an entirety of a computer device by using software, hardware, or a combination of software and hardware. The computer device may be the computer device shown in FIG. 3, and the computer device is the authorization device in the foregoing embodiment. In some embodiments of this application, the apparatus 1100 is used in an authorization device, the authorization device and a terminal device share a first symmetric key, the authorization device stores an ownership relationship record of the terminal device, and the ownership relationship record describes a binding relationship between the terminal device and a current owner of the terminal device. As shown in FIG. 11, the apparatus 1100 includes a receiving module 1101, a first verification module 1102, and a sending module 1103.

The receiving module 1101 is configured to receive a second authentication request, where the second authentication request carries a first authentication code, and the first authentication code is generated by the terminal device based on the first symmetric key.

The first verification module 1102 is configured to verify the first authentication code based on the first symmetric key and the ownership relationship record.

The sending module 1103 is configured to send a first authentication acknowledgement message after verification succeeds, where the first authentication acknowledgement message indicates to authorize an ownership relationship between the terminal device and a network to which the registration device belongs, the first authentication acknowledgement message carries a second authentication code, the second authentication code is generated based on the first symmetric key, and the second authentication code indicates to the terminal device to determine, after verification on the second authentication code based on the first symmetric key succeeds, that bidirectional identity authentication of the terminal device and the registration device succeeds.

Optionally, the second authentication request further carries a first ID, a first key parameter, and first identity information, the first key parameter is generated by the terminal device, the first identity information includes at least one of identity information of the registration device or identity information of the network to which the registration device belongs, the first ID is an ID configured by an original owner of the terminal device for the terminal device, and the ownership relationship record includes a mapping relationship between the first ID and the first identity information.

The apparatus 1100 further includes:

a second verification module, configured to verify the first ID and the first identity information based on the ownership relationship record.

The first verification module includes:

a verification submodule, configured to verify the first authentication code based on the ownership relationship record, the first ID, the first symmetric key, and the first key parameter.

Optionally, the first authentication acknowledgement message further carries a second key parameter, the second key parameter includes plaintext or ciphertext of a second AV, and the ciphertext of the second AV is obtained by using the key shared by the authorization device and the terminal device.

The second AV includes a second anti-replay attack parameter, the second authentication code is generated based on the first symmetric key and the second AV, and the first authentication acknowledgement message is further used for the terminal device to verify the second authentication code based on the first symmetric key and the second key parameter.

Optionally, the first authentication acknowledgement message further carries key update information, and the key update information is generated based on the first symmetric key and the second AV.

The key update information is used for the registration device to obtain a channel security key required for establishing a first secure transport channel with the terminal device, and to negotiate a second symmetric key with the terminal device by using the first secure transport channel, the second key parameter is further used for the terminal device to determine a first derived parameter required for generating the channel security key, and to determine a second derived parameter required for negotiating the second symmetric key with the registration device by using the first secure transport channel, and the second symmetric key is used for network access identity authentication when the terminal device accesses the network to which the registration device belongs.

In some embodiments of this application, a symmetric key based identity verification method is implemented by sharing the first symmetric key between the terminal device and the authorization device. In this way, when confidentiality of the symmetric key is ensured, authentication code generated based on the symmetric key in an entire identity authentication process is not easily forged, so that security and reliability of identity authentication can be ensured. In addition, in this solution, bidirectional identity authentication of the terminal device and the registration device is implemented by using the authorization device, to avoid a security issue of unidirectional identity authentication. That is, security of this solution is higher.

It should be noted that, when the identity authentication apparatus provided in the foregoing embodiment performs identity authentication, division of the foregoing functional modules is merely used as an example for description. In an actual application, the foregoing functions may be allocated to different functional modules for implementation as required, that is, an internal structure of the apparatus is divided into different functional modules, so as to implement all or some of the functions described above. In addition, the identity authentication apparatus provided in the foregoing embodiment and the identity authentication method embodiment pertain to a same concept. For a detailed implementation process of the apparatus, refer to the method embodiment. Details are not described herein again.

An embodiment of this application provides an identity authentication system. The identity authentication system includes a terminal device, a registration device, and an authorization device. The terminal device and the authorization device share a first symmetric key, the authorization device stores an ownership relationship record of the terminal device, and the ownership relationship record describes a binding relationship between the terminal device and a current owner of the terminal device.

The terminal device is configured to send a first authentication request to the registration device, where the first authentication request carries a first authentication code, and the first authentication code is generated based on the first symmetric key.

The registration device is configured to: receive the first authentication request, generate a second authentication request based on the first authentication request, and send the second authentication request to the authorization device, where the second authentication request carries the first authentication code.

The authorization device is configured to: receive the second authentication request, verify the first authentication code based on the first symmetric key and the ownership relationship record, and send a first authentication acknowledgement message to the registration device after verification succeeds, where the first authentication acknowledgement message indicates to authorize an ownership relationship between the terminal device and a network to which the registration device belongs, the first authentication acknowledgement message carries a second authentication code, and the second authentication code is generated based on the first symmetric key.

The registration device is further configured to: receive the first authentication acknowledgement message, determine a second authentication acknowledgement message based on the first authentication acknowledgement message, and send the second authentication acknowledgement message to the terminal device, where the second authentication acknowledgement message carries the second authentication code.

The terminal device is further configured to: receive the second authentication acknowledgement message, verify the second authentication code based on the first symmetric key, and determine, after verification succeeds, that bidirectional identity authentication of the terminal device and the registration device succeeds.

In some embodiments of this application, a symmetric key based identity verification method is implemented by sharing the first symmetric key between the terminal device and the authorization device. In this way, when confidentiality of the symmetric key is ensured, authentication code generated based on the symmetric key in an entire identity authentication process is not easily forged, so that security and reliability of identity authentication can be ensured. In addition, in this solution, bidirectional identity authentication of the terminal device and the registration device is implemented by using the authorization device, to avoid a security issue of unidirectional identity authentication. That is, security of this solution is higher.

It should be noted that, the identity authentication system provided in the foregoing embodiment and the identity authentication method embodiment pertain to a same concept. For a detailed implementation process of the identity authentication system, refer to the method embodiment. Details are not described herein again.

All or some of the foregoing embodiments may be implemented by using software, hardware, firmware, or any combination thereof. When software is used for implementation, the modules may be entirely or partially implemented in a form of a computer program product. The computer program product includes one or more computer instructions. When the computer instructions are loaded and executed on a computer, procedures or functions according to embodiments of this application are entirely or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, a solid state disk (SSD)), or the like. It should be noted that, the computer-readable storage medium mentioned in embodiments of this application may be a non-volatile storage medium, in other words, may be a non-transitory storage medium.

It should be understood that, "at least one" mentioned in this specification means one or more, and "a plurality of" means two or more. In the description of embodiments of this application, unless otherwise stated, "/" means "or", for example, A/B may represent A or B. The term "and/or" in this specification describes only an association relationship between associated objects, and indicates that three relationships may exist. For example, A and/or B may represent three cases: Only A exists, both A and B exist, and only B exists. In addition, for ease of clearly describing the technical solutions in embodiments of this application, in embodiments of this application, words such as "first" and "second" are used to distinguish same items or similar items whose functions and roles are basically the same. A person skilled in the art may understand that words such as "first" and "second" do not limit a quantity and an execution order, and words such as "first" and "second" do not limit a definite difference.

The foregoing descriptions are embodiments provided in this application, but are not intended to limit this application. Any modification, equivalent replacement, improvement, or the like made within the principle of this application shall fall within the protection scope of this application.

What is claimed is:

1. An identity authentication system, wherein the identity authentication system comprises a terminal device, a registration device, and an authorization device, wherein the terminal device and the authorization device share a first symmetric key, the authorization device stores an ownership relationship record of the terminal device, and the ownership relationship record describes a binding relationship between the terminal device and a current owner of the terminal device;

the terminal device is configured to send a first authentication request to the registration device, wherein the first authentication request carries a first authentication code, and the first authentication code is generated based on the first symmetric key;

the registration device is configured to: receive the first authentication request, generate a second authentication request based on the first authentication request, and send the second authentication request to the authorization device, wherein the second authentication request carries the first authentication code;

the authorization device is configured to: receive the second authentication request, verify the first authentication code based on the first symmetric key and the ownership relationship record, and send a first authentication acknowledgement message to the registration device after verification succeeds, wherein the first authentication acknowledgement message indicates to authorize an ownership relationship between the terminal device and a network to which the registration device belongs, the first authentication acknowledgement message carries a second authentication code, and the second authentication code is generated based on the first symmetric key;

the registration device is further configured to: receive the first authentication acknowledgement message, determine a second authentication acknowledgement message based on the first authentication acknowledgement message, and send the second authentication acknowledgement message to the terminal device, wherein the second authentication acknowledgement message carries the second authentication code; and the terminal device is further configured to: receive the second authentication acknowledgement message, verify the second authentication code based on the first symmetric key, and determine, after verification succeeds, that bidirectional identity authentication of the terminal device and the registration device succeeds.

2. An identity authentication method, wherein the method is performed by a terminal device, the terminal device and an authorization device share a first symmetric key, the authorization device stores an ownership relationship record of the terminal device, and the method comprises:

sending, by the terminal device, a first authentication request to a registration device, wherein the first authentication request carries a first authentication code, and the first authentication code is generated based on the first symmetric key;

receiving, by the terminal device, a first authentication acknowledgement message from the registration device, wherein the first authentication acknowledgement message is received from the registration device after verification on the first authentication code based on the first symmetric key and the ownership relationship record succeeds, the first authentication acknowledgement message carries a second authentication code, and the second authentication code is generated by the authorization device based on the first symmetric key; and verifying, by the terminal device, the second authentication code based on the first symmetric key, and determining, after verification succeeds, that bidirectional identity authentication of the terminal device and the registration device succeeds.

3. The method according to claim 2, wherein the first authentication request further carries a first identity (ID) and a first key parameter, the first key parameter comprises plaintext or ciphertext of a first authentication vector (AV), and the first ID is an ID configured by an original owner of the terminal device for the terminal device;

the first AV comprises a first random parameter and a first anti-replay attack parameter, the first random parameter is generated by the terminal device, and the first random parameter comprises at least one of a first random number N1 and a second random number N2; and the first authentication code is generated based on the first symmetric key, the first ID, and the first AV.

4. The method according to claim 3, wherein the first authentication request further carries first identity information, and the first identity information comprises at least one of identity information of the registration device or identity information of a network to which the registration device belongs; and the first authentication code is generated based on the first symmetric key, the first ID, the first AV, and the first identity information.

5. An identity authentication method, wherein the method is performed by a registration device, and the method comprises:

receiving, by the registration device, a first authentication request, wherein the first authentication request carries a first authentication code, the first authentication code is generated by a terminal device based on a first symmetric key, and the terminal device and an authorization device share the first symmetric key;

generating, by the registration device, a second authentication request based on the first authentication request, and sending the second authentication request to the authorization device, wherein the second authentication request carries the first authentication code;

receiving, by the registration device, a first authentication acknowledgement message, wherein the first authentication acknowledgement message is determined after verification performed by the authorization device on the first authentication code based on the first symmetric key and an ownership relationship record of the terminal device succeeds, wherein the ownership relationship record is stored on the authorization device, the ownership relationship record describes a binding relationship between the terminal device and a current owner of the terminal device, the first authentication acknowledgement message indicates to the registration device to authorize an ownership relationship between the terminal device and a network to which the registration device belongs, the first authentication acknowledgement message carries a second authentication code, and the second authentication code is generated based on the first symmetric key; and determining, by the registration device, a second authentication acknowledgement message based on the first authentication acknowledgement message, and sending the second authentication acknowledgement message to the terminal device, wherein the second authentication acknowledgement message carries the second authentication code, and the second authentication acknowledgement message indicates to the terminal device to determine, after verification on the second authentication code based on the first symmetric key succeeds, that bidirectional identity authentication of the terminal device and the registration device succeeds.

6. The method according to claim 5, wherein the first authentication request further carries a first identity (ID), the first ID is an ID configured by an original owner of the terminal device for the terminal device, the second authentication request further carries the first ID in the first authentication request, the second authentication request further carries first identity information, and the first identity information comprises at least one of identity information of the registration device and identity information of the network to which the registration device belongs.

7. The method according to claim 6, wherein the second authentication request further carries an identity signature of the registration device, and the identity signature of the registration device is a signature generated by the registration device on the first authentication request and the first identity information by using a private key.

8. The method according to claim 6, wherein the identity information of the registration device comprises at least one of a digital certificate related to an identity of the registration device or a digest of the digital certificate related to the identity of the registration device.

9. An identity authentication method, wherein the method is performed by an authorization device, the authorization device and a terminal device share a first symmetric key, the authorization device stores an ownership relationship record of the terminal device, the ownership relationship record describes a binding relationship between the terminal device and a current owner of the terminal device, and the method comprises:

receiving, by the authorization device, a first authentication request from a registration device, wherein the first authentication request carries a first authentication code, and the first authentication code is generated by the terminal device based on the first symmetric key;

verifying, by the authorization device, the first authentication code based on the first symmetric key and the ownership relationship record; and sending, by the authorization device, to the registration device, a first authentication acknowledgement message after verification succeeds, wherein the first authentication acknowledgement message indicates to the registration device to authorize an ownership relationship between the terminal device and a network to which the registration device belongs, the first authentication acknowledgement message carries a second authentication code, the second authentication code is generated based on the first symmetric key, and the second authentication code indicates to the terminal device to determine, after verification on the second authentication code based on the first symmetric key succeeds, that bidirectional identity authentication of the terminal device and the registration device succeeds.

10. The method according to claim 9, wherein the second authentication request further carries a first identity (ID), a first key parameter, and first identity information, the first key parameter is generated by the terminal device, the first identity information comprises at least one of identity information of the registration device or identity information of the network to which the registration device belongs, the first ID is an ID configured by an original owner of the terminal device for the terminal device, and the ownership relationship record comprises a mapping relationship between the first ID and the first identity information;

after the receiving, by the authorization device, a second
        authentication request, the method further comprises:

verifying, by the authorization device, the first ID and the
        first identity information based on the ownership relationship record; and the verifying, by the authorization device, the first authen-
        tication code based on the first symmetric key and the
        ownership relationship record comprises:

verifying, by the authorization device, the first authentication code based on the ownership relationship record,
        the first ID, the first symmetric key, and the first key
        parameter.

* * * * *